(12) United States Patent
Lee et al.

(10) Patent No.: US 12,737,154 B2
(45) Date of Patent: Sep. 15, 2026

(54) COMPUTING DEVICE AND METHOD USING MULTIPLIER-ACCUMULATOR

(71) Applicant: Samsung Electronics Co., Ltd., Suwon-si (KR)

(72) Inventors: Jaehyuk Lee, Suwon-si (KR); Sang Joon Kim, Hwaseong-si (KR); Seungchul Jung, Suwon-si (KR); Sungmeen Myung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1081 days.

(21) Appl. No.: 17/735,492

(22) Filed: May 3, 2022

(65) Prior Publication Data

US 2023/0075348 A1 Mar. 9, 2023

(30) Foreign Application Priority Data

Sep. 8, 2021 (KR) ........................ 10-2021-0119757

(51) Int. Cl.
*G06F 7/544* (2006.01)
*G06F 7/48* (2006.01)

(52) U.S. Cl.
CPC .......... *G06F 7/5443* (2013.01); *G06F 7/4824* (2013.01)

(58) Field of Classification Search
CPC ............................ G06F 7/4824; G06F 7/5443
See application file for complete search history.

(56) References Cited

U.S. PATENT DOCUMENTS 10,249,362 B2 * 4/2019 Shu ........................ G11C 11/418
10,636,481 B1 4/2020 Chang et al.
(Continued)

FOREIGN PATENT DOCUMENTS

KR 10-2003-0072860 A 9/2003
KR 10-2020-0100286 A 8/2020
(Continued)

OTHER PUBLICATIONS

Jia, Hongyang, et al. "A Programmable Heterogeneous Microprocessor Based on Bit-Scalable In-Memory Computing." *IEEE Journal of Solid-State Circuits* vol. 55 Issue 9 May 29, 2020 (13 pages in English).

(Continued)

*Primary Examiner* — Emily E Larocque
*Assistant Examiner* — Carlos Heberto De La Garza
(74) *Attorney, Agent, or Firm* — NSIP Law

(57) ABSTRACT

A multiplier-accumulator includes: a plurality of exclusive negative OR (XNOR) gates provided along one or more input lines and configured to receive signals corresponding to an input bit sequence and a weight bit sequence corresponding to each of the one or more input lines and to output partial product results between the input bit sequence and the weight bit sequence; an encoder configured to apply, to the plurality of XNOR gates, a signal corresponding to a sequence in which a logical value of a most significant bit (MSB) is converted from an original sequence expressed in 2's complement of a corresponding sequence for either one or both of the input bit sequence and the weight bit sequence; and an outputter configured to generate an output in which a correction value is applied to operation results in which the partial product results output from the plurality of XNOR gates are summed.

23 Claims, 13 Drawing Sheets

(56) References Cited

U.S. PATENT DOCUMENTS

| | | | | |
|---|---|---|---|---|
| 11,126,402 | B2 * | 9/2021 | Li | G11C 11/419 |
| 11,355,167 | B2 * | 6/2022 | Seok | G11C 7/1036 |
| 11,657,238 | B2 * | 5/2023 | Srivastava | G11C 11/412 708/523 |
| 12,481,867 | B2 * | 11/2025 | Chou | G11C 11/54 |
| 12,554,975 | B2 * | 2/2026 | Lee | G06F 7/5443 |
| 2003/0061471 | A1 | 3/2003 | Matsuo | |
| 2019/0057300 | A1 | 2/2019 | Mathuriya et al. | |
| 2019/0228307 | A1 * | 7/2019 | Lee | G06F 5/01 |
| 2020/0218963 | A1 | 7/2020 | Yasuda et al. | |
| 2020/0301668 | A1 | 9/2020 | Li | |
| 2021/0133541 | A1 | 5/2021 | Vasanthakumaribabu et al. | |

FOREIGN PATENT DOCUMENTS

| | | | |
|---|---|---|---|
| KR | 10-2182299 | B1 | 11/2020 |
| KR | 10-2021-0050243 | A | 5/2021 |
| WO | WO 2021/038228 | A1 | 3/2021 |

OTHER PUBLICATIONS

Sun, Xiaoyu, et al. "Computing-in-Memory with SRAM and RRAM for Binary Neural Networks." 2018 14th IEEE International Conference on Solid-State and Integrated Circuit Technology (ICSICT). IEEE, 2018., (4 pages in English).

Ardakani, Arash, et al. "The Synthesis of XNOR Recurrent Neural Networks with Stochastic Logic." Advances in Neural Information Processing Systems 32 (2019)., (11 pages in English).

Extended European search report issued on Dec. 14, 2022, in counterpart European Patent Application No. 22181029.4 (6 pages in English).

Japanese Office Action Issued on May 19, 2026, in Counterpart Japanese Patent Application No. 2022-139128 (2 Pages in English, 3 Pages in Japanese).

* cited by examiner

| I' | W' | O | Value |
|---|---|---|---|
| 0 | 0 | 1 | 10mV |
| 0 | 1 | 0 | 5mV |
| 1 | 0 | 0 | 5mV |
| 1 | 1 | 1 | 10mV |

COMPUTING DEVICE AND METHOD USING MULTIPLIER-ACCUMULATOR

CROSS-REFERENCE TO RELATED APPLICATIONS

This application claims the benefit under 35 USC § 119 (a) of Korean Patent Application No. 10-2021-0119757, filed on Sep. 8, 2021 in the Korean Intellectual Property Office, the entire disclosure of which is incorporated herein by reference for all purposes.

BACKGROUND

1. Field

The following description relates to computing device and method using a multiplier-accumulator.

2. Description of Related Art

A vector matrix multiplication operation also known as a multiply and accumulate or a multiply-accumulate (MAC) operation may determine performance of an application. For example, the MAC operation may be performed in machine learning and authentication operation of a neural network that includes multiple layers. An input signal may be considered to form an input vector and may be data related to an image, a byte stream, or other data sets. An output vector may be acquired from MAC operation results acquired by multiplying an input vector by a weight and accumulating the same, and the output vector may be provided as an input vector for a subsequent layer. Since he MAC operation is repeated for a plurality of layers, a neural network processing performance may be mainly determined by the performance of the MAC operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a multiplier-accumulator includes: a plurality of exclusive negative OR (XNOR) gates provided along one or more input lines and configured to receive signals corresponding to an input bit sequence and a weight bit sequence corresponding to each of the one or more input lines and to output partial product results between the input bit sequence and the weight bit sequence; an encoder configured to apply, to the plurality of XNOR gates, a signal corresponding to a sequence in which a logical value of a most significant bit (MSB) is converted from an original sequence expressed in 2's complement of a corresponding sequence for either one or both of the input bit sequence and the weight bit sequence; and an outputter configured to generate an output in which a correction value is applied to operation results in which the partial product results output from the plurality of XNOR gates are summed.

The encoder may include an input encoder configured to: sequentially receive an original input sequence expressed in 2's complement of the input bit sequence for each bit position; and in response to receiving the MSB, apply a signal corresponding to a value in which the logical value of the MSB for the original input sequence is converted to the plurality of XNOR gates provided to an input line of the one or more input lines corresponding to the input bit sequence.

The outputter may be configured to apply a first correction value, that is determined based on a sum of weights set to the plurality of XNOR gates for the operation results, to the operation results in which the partial product results are summed.

The outputter may be configured to subtract, from the operation results, the first correction value that is determined as a half of the sum of the weights.

The input encoder may be configured to sequentially transmit a signal corresponding to a logical value of an input bit sequence having a same number of bits as a number of bits of the original input sequence to the plurality of XNOR gates during a cycle corresponding to the number of bits of the original input sequence.

The multiplier-accumulator may be configured to record a sum of weights individually set to the plurality of XNOR gates for multiplication and accumulation.

The plurality of XNOR gates may be provided along an input line of the one or more input lines for the input bit sequence for each bit position allocated to a plurality of output lines grouped for a single operation of multiplication and accumulation, and the encoder may include a weight encoder configured to set the weight bit sequence to an XNOR gate provided along the input line for each bit position.

The outputter may be configured to apply a second correction value that is determined based on a sum of one or more input bit sequences to the operation results in which the partial product results are summed.

The outputter may be configured to subtract, from the operation results, the second correction value that is determined as a half of the sum of the one or more input bit sequences.

The plurality of XNOR gates may be provided in a same number as a number of bits of an original weight sequence for an individual output for each of the one or more input lines, and the multiplier-accumulator further may include an additional memory cell provided along an additional line distinct from an output line for input summation.

In response to applying an input logical value for each bit position of one or more input bit sequences for multiplication and accumulation, the multiplier-accumulator may be configured to calculate a sum of the one or more input bit sequences by summing the input logical value for each bit position based on a corresponding bit position.

The outputter may be configured to apply a third correction value based on a number of inputs to the operation results, when the encoder may include an input encoder configured to encode an original input sequence and a weight encoder configured to encode an original weight sequence.

The outputter may be configured to add, to the operation results, the third correction value that is determined as a value acquired by dividing the number of inputs by 4.

The multiplier-accumulator may be configured to receive P inputs through P input lines and to set a weight logical value corresponding to each bit position of a weight set for each of the P inputs to a corresponding XNOR gate.

For each completion of calculation of an output for a node of a subsequent layer in a layer of a neural network, the multiplier-accumulator may be configured to set a weight for an output for another node of the subsequent layer to the plurality of XNOR gates.

The multiplier-accumulator further may include one or more output lines grouped for each of a plurality of nodes of a subsequent layer connected to a layer of a neural network, and may be configured to set a weight logical value for an XNOR gate for each of the one or more output lines, and to perform multiplication and accumulation in a plurality of nodes of the subsequent layer in parallel.

The multiplier-accumulator may be configured to perform a summation of a partial product corresponding to a bit position corresponding to a corresponding output line by accumulating an analog signal representing XNOR results output from an XNOR gate connected to a same output line among the plurality of XNOR gates in a single cycle.

The encoder may be configured to apply a signal corresponding to a logical value corresponding to a single cycle among logical values of an input bit sequence input to a corresponding input line of the one or more input lines to an XNOR gate provided along the corresponding input line.

In another general aspect, a computing method performed by a multiplier-accumulator includes: applying, to a plurality of exclusive negative OR (XNOR) gates corresponding to each of one or more input lines, a signal corresponding to a sequence in which a logical value of a most significant bit (MSB) is converted from an original sequence expressed in 2's complement of a corresponding sequence for either one or both of an input bit sequence and a weight bit sequence; in response to the plurality of XNOR gates receiving signals corresponding to an input bit sequence and a weight bit sequence corresponding to a corresponding input line of the one or more input lines, outputting partial product results between the input bit sequence and the weight bit sequence; and generating an output in which a correction value is applied to operation results in which the partial product results output from the plurality of XNOR gates are summed.

In another general aspect, one or more embodiments include a non-transitory computer-readable storage medium storing instructions that, when executed by one or more processors, configure the one or more processors to perform any one, any combination, or all operations and methods described herein.

In another general aspect, a multiplier-accumulator includes: an encoder configured to generate a sequence in which a logical value of a most significant bit (MSB) is converted from an original sequence expressed in 2's complement of a corresponding sequence for either one or both of an input bit sequence and a weight bit sequence; a plurality of memory cells provided along one or more input lines and configured to output partial product results between the input bit sequence and the weight bit sequence, based on the generated sequence; and an outputter configured to generate an output based on a summation of the partial product results and one or more correction values.

The one or more correction values may include either one or both of: a first correction value determined based on a sum of one or more weight bit sequences including the weight bit sequence; and a second correction value determined based on a sum of one or more input bit sequences including the input bit sequence.

Each of the memory cells may include an exclusive negative OR (XNOR) gate.

A number of bits of the generated sequence may be a same number of bits of the original sequence.

Other features and aspects will be apparent from the following detailed description, the drawings, and the claims.

Figure 1:
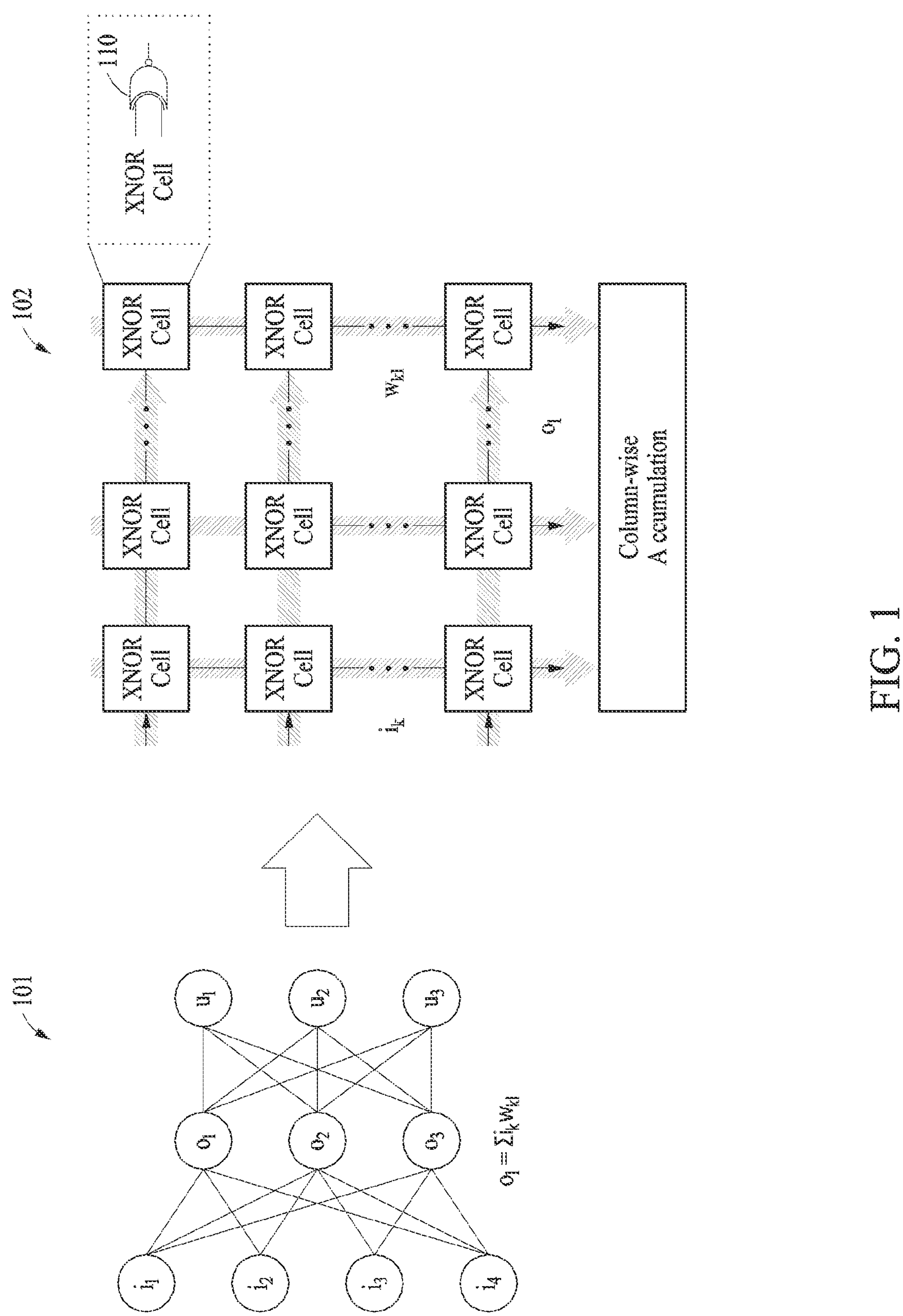
FIG. 1 illustrates an example of a multiplication using an exclusive negative OR (XNOR) gate in a multiply and accumulate (MAC) operation of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and concisenes.

Although terms of "first," "second," and the like are used to explain various members, components, regions, layers, or sections, these members, components, regions, layers, or sections are not limited to such terms. Rather, these terms are used only to distinguish one member, component, region, layer, or section from another member, component, region, layer, or section. For example, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined herein, all terms used herein including technical or scientific terms have the same meanings as those generally understood by one of ordinary skill in the art to which this disclosure pertains after and understanding of the present disclosure. Terms defined in dictionaries generally used should be construed to have meanings matching contextual meanings in the related art and the present disclosure, and are not to be construed as an ideal or excessively formal meaning unless otherwise defined herein.

Hereinafter, the examples are described in detail with reference to the accompanying drawings. Like reference numerals illustrated in the respective drawings refer to like elements and further description related thereto is omitted.

FIG. 1 illustrates an example of an exclusive negative OR (XNOR) gate in a multiply and accumulate (MAC) operation.

In an example, a computing device may process a neural network 101 through in-memory computing (IMC). Such in-memory computing may refer to an operation using a memory to which an arithmetic operation function is added. The computing device may include a hardware accelerator using in-memory computing. The neural network 101 may include one or more layers, and each layer may include a plurality of nodes. The plurality of nodes may be connected to nodes of another layer through a connection line and a weight may be set to the connection line. For example, an output $O_1$ of a single corresponding node may be determined based on input values $i_1$, $i_2$, $i_3$, and $i_4$ propagated from other nodes of a previous layer connected to the corresponding node and weights $w_{11}$, $w_{21}$, $w_{31}$, and $w_{41}$ of connection lines connecting the other nodes to the corresponding node. Among V output values, an $I^{th}$ output of may be represented as the following Equation 1, for example. Here, V denotes an integer of 1 or more and I denotes an integer of 1 or more and V or less.

$$o_l = \sum i_k w_{kl} \quad \text{Equation 1}$$

In Equation 1, $i_k$ denotes a $k^{th}$ input among P inputs and $w_{ki}$ denotes a weight set between the $k^{th}$ input and an $I^{th}$ output. Here, P denotes an integer of 1 or more and k denotes an integer of 1 or more and P or less. Also, in the neural network 101, an input/output between nodes may be expressed as a weighted sum between the input and the output as shown in the above Equation 1. The weighted sum refers to a multiplication operation and an iterative addition operation between a plurality of inputs and plurality of weights and may also be referred to as a MAC operation. The computing device that performs the MAC operation may be referred to as a multiplier-accumulator and a circuit in which multiplication and accumulation is performed may be referred to as a multiplier-accumulator circuit.

Referring to FIG. 1, in in-memory computing, the multiplier-accumulator circuit may accumulate multiplication operation results performed in a memory cell including a multiplication operation function through a bitline (e.g., a column line). For example, the memory cell may include a logic gate for a multiplication operation and a signal corresponding to a weight may be applied to an input terminal of the logic gate. A structure in which memory cells are provided along a plurality of input lines and a plurality of output lines may be expressed as a crossbar array structure 102. Among the plurality of memory cells, memory cells provided along the same input line may receive the same input and memory cells provided along the same output line may output multiplication results for the same output.

In an example, the multiplier-accumulator circuit may perform a MAC operation for an input and a weight with the range of a positive number and a negative number. For example, through an XNOR gate 110 that includes the multiplier-accumulator circuit for each memory cell, a multiplication operation may be performed for each bit position. For example, the truth table of the XNOR gate 110 may be represented as the following Table 1.

TABLE 1

| A | | B | | $\overline{A \oplus B}$ | |
|---|---|---|---|---|---|
| Logical value | Bit value | Logical value | Bit value | Logical value | Bit value |
| 0(L) | −1 | 0(L) | −1 | 1(H) | 1 |
| 0(L) | −1 | 1(H) | 1 | 0(L) | −1 |
| 1(H) | 1 | 0(L) | −1 | 0(L) | −1 |
| 1(H) | 1 | 1(H) | 1 | 1(H) | 1 |

Referring to Table 1, a bit value of −1 may be expressed as a logical value of 0 and a bit value of 1 may be expressed as a logical value of 1. The bit value may represent a numerical value actually calculated and the logical value may represent a bit symbol allocated to each bit value. The logical value of 0 may be expressed as L and the logical value of 1 may be expressed as H. Referring to Table 1, XNOR results between logical values correspond to product results between corresponding bit values. The multiplier-accumulator may process a multiplication between an input and an output with the positive and negative range through a multiplication operation using the XNOR gate 110. Hereinafter, a new number system having a bit value of −1 or 1 for each bit position is described.

Figure 2:
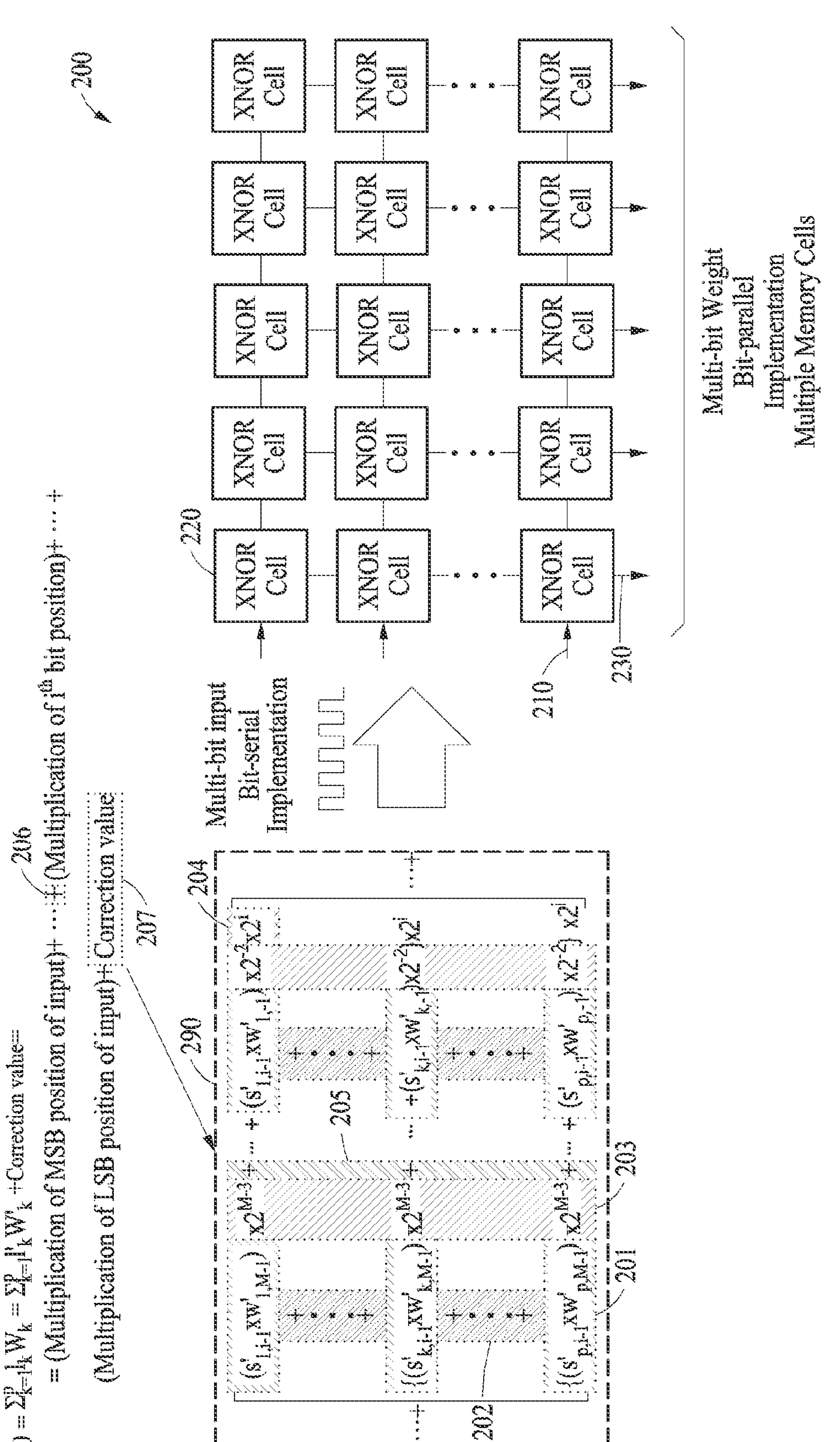
FIG. 2 illustrates an example of a MAC operation for each bit position in a number system.

Although description is made based on Table 1 in which a logical value of 0 is a bit value of −1 and a logical value of 1 is a bit value of 1, it is provided as an example only. That is, depending on a design, allocation may be reversed. For example, a logical value of 1 may be allocated to a bit value of −1 and a logical value of 0 may be allocated to a bit value of 1. FIG. 2 illustrates an example of a MAC operation for each bit position in a number system.

In an example, an original input value I may be expressed as N bits of 2's complement system. Here, N denotes an integer of 2 or more. In 2's complement system, a most significant bit (MSB) represents a sign. Therefore, when a logical value of the MSB is 1, a bit value may be interpreted as −1. For example, an N-bit input value expressed in 2's complement may be represented as the following Equation 2.

$$I=(-1)2^{N-1}x_{N-1}+2^{N-2}x_{N-2}+\ldots+2^1a_1+2^0a_0 \qquad \text{Equation 2}$$

$$x_i = 1 \text{ or } 0 \text{ for } i=0, \ldots, N-1$$

$$x_i' = \begin{cases} -x_i, & \text{if } i=N-1 \\ x_i, & \text{else} \end{cases}$$

In Equation 2, $x_i$ denotes a logical value of an $i^{th}$ bit position and $x'_I$ denotes a bit value of the $i^{th}$ bit position. An input I may be converted to the following Equation 3, for example.

$$\begin{aligned} I &= \sum_{i=0}^{N-1} 2^i x_i' = (-1)2^{N-1}\left(x_{N-1}-\frac{1}{2}+\frac{1}{2}\right)+ \\ &\quad 2^{N-2}(x_{N-2})+\ldots+2^1(x_1)+2^0(x_0) \\ &= (-1)2^{N-1}\left(x_{N-1}-\frac{1}{2}\right)+\left(2^{N-2}+\ldots+2^1+2^0+1\left(\frac{-1}{2}\right)\right)+ \\ &\quad 2^{N-2}(x_{N-2})+\ldots+2^1(x_1)+2^0(x_0) \\ &= 2^{N-2}\{(-1)(2x_{N-1}-1)\}+2^{N-3}(2x_{N-2}-1)+\ldots+ \\ &\quad 2^0(2x_1-1)+2^{-1}(2x_0-1)-\frac{1}{2} \\ &= \left(2^{N-2}s_{n-2}'+2^{N-3}s_{n-3}'+\ldots+2^0s_0'+2^1s_{-1}'\right)-\frac{1}{2} \\ &= \left(\sum_{i=0}^{N-1}2^{i-1}s_{i-1}'\right)-\frac{1}{2} \end{aligned} \qquad \text{Equation 3}$$

In Equation 3, $s'_{i-1}$ denotes a bit value of a new number system that replaces 2's complement expression. A relationship between the bit value $s'_{i-1}$ in of the new number system and the logical value of 2's complement may be arranged as in the following Equation 4, for example.

$$S_{i-1}' = \begin{cases} -(2x_{N-1}-1), & \text{if } i=N-1 \\ 2x_i-1, & \text{if } i<N-1 \end{cases} \text{ for } i=0, \ldots, N-1 \qquad \text{Equation 4}$$

For example, the logical value $s_{i-1}$ for the bit value $s'_{i-1}$ in of the new number system may be defined as in the following Equation 5.

$$S_{i-1} = \begin{cases} 1, & \text{if } s_{i-1}'=1 \\ 0, & \text{if } s_{i-1}'=-1 \end{cases}, \text{ where } i<N-1 \qquad \text{Equation 5}$$

The relationship between the logical value and the bit value in 2's complement system and the new number system described above with reference to Equation 3 to Equation 5 may be arranged as in the following Table 2, for example.

TABLE 2

| | 2's complement system | | | | New number system | | | |
|---|---|---|---|---|---|---|---|---|
| Bit position | Logical value | | Bit value | | Logical value | | Bit value | |
| MSB | $x_{N-1}$ | 1 | $x'_{N-1}=$ | −1 | $s_{N-2}$ | 0 | $s'_{N-2}=$ | −1 |
| | | 0 | $-x_{N-1}$ | 0 | | 1 | $-(2x'_{N-1})$ | 1 |
| Others | $x_i$ | 0 | $x'_i$ | 0 | $s_{i-1}$ | 0 | $s'_{i-1}=$ | −1 |
| | | 1 | | 1 | | 1 | $2x'_i\text{-}1$ | 1 |

Referring to Table 2, when only a logical value of a bit position corresponding to an MSB is converted, an original sequence expressed in 2's complement system may be expressed as the new number system. Converting the logical value of the MSB may represent changing the logical value of the MSB from 1 to 0 or from 0 to 1, which may also be represented as a logical value inversion. The aforementioned logical value conversion of the MSB may be simply implemented at a circuit level.

Here, an input bit sequence I' expressed as logical values defined in Equation 5 may represent a value shifted from an original input value I by −½ as in Equation 6 below, for example.

$$I=I'-\frac{1}{2}, \text{ where } I'=\sum_{i=0}^{N-1}2^{i-1}s_{i-1}' \qquad \text{Equation 6}$$

Therefore, to accurately express the original input value I, a 1-bit logical value of 0 may additionally be used in addition to N-bit logical values of $S_{N-2}$ to $S_{-1}$ as in the following Equation 7, for example. For example, 2 bits including a positive least significant bit (LSB) (e.g., −1p bit of FIG. 6) and a negative LSB (e.g., −1n bit of FIG. 6) may be used for LSB expression.

$$I <-> [s_{N-2}, s_{N-3}, \ldots, s_0, s_{-1}; 0] \qquad \text{Equation 7}$$

The logical value of 0 additionally used in Equation 7 represents −½ shown in Equation 6, and may represent a value of −1 corresponding to −1 power position of 2 (e.g., $(-1)2^{-1}$). For example, in the original input value, a value of −1 power position of 2 may be expressed as a logical value of $s_{-1}$ and 0. For understanding, an example in which an integer of −4 or more and 3 or more is represented as 3-bit 2's complement system and an example in which the integer is represented as 3-bit new number system are described with reference to the following Table 3.

TABLE 3

| 3-bit 2's complement system | | 3-bit new number system | |
|---|---|---|---|
| 100 | $-2^2 \times (1) + 2^1 \times (0) + 2^0 \times (0) = -4$ | I' = 000<br>I = (000,0) | $2^1 \times (-1) + 2^0 \times (-1) + 2^{-1} \times (-1) = -3.5$<br>$(-2 - 1 - ½ - ½ = -4)$ |
| 101 | $-2^2 \times (1) + 2^1 \times (0) + 2^0 \times (1) = -3$ | 001<br>(001,0) | $2^1 \times (-1) + 2^0 \times (-1) + 2^{-1} \times (1) = -2.5$<br>$(-2 - 1 + ½ - ½ = -3)$ |
| 110 | $-2^2 \times (1) + 2^1 \times (1) + 2^0 \times (0) = -2$ | 010<br>(010,0) | $2^1 \times (-1) + 2^0 \times (1) + 2^{-1} \times (-1) = -1.5$<br>$(-2 + 1 - ½ - ½ = -2)$ |
| 111 | $-2^2 \times (1) + 2^1 \times (1) + 2^0 \times (1) = -1$ | 011<br>(011,0) | $2^1 \times (-1) + 2^0 \times (1) + 2^{-1} \times (1) = -0.5$<br>$(-2 + 1 + ½ - ½ = -1)$ |
| 000 | $-2^2 \times (0) + 2^1 \times (0) + 2^0 \times (0) = 0$ | 100<br>(100,0) | $2 - 1 - ½ = 0.5$<br>$(2^1 \times (1) + 2^0 \times (-1) + 2^{-1} \times (-1) = 0)$ |
| 001 | $-2^2 \times (0) + 2^1 \times (0) + 2^0 \times (1) = 1$ | 101<br>(101,0) | $2^{-1} + ½ = 1.5$<br>$(2^1 \times (1) + 2^0 \times (-1) + 2^{-1} \times (1) + 2^{-1} \times (-1) = 1)$ |
| 010 | $-2^2 \times (0) + 2^1 \times (1) + 2^0 \times (0) = 2$ | 110<br>(110,0) | $2 + 1 - ½ = 2.5$<br>$(2^1 \times (1) + 2^0 \times (1) + 2^{-1} \times (-1) + 2^{-1} \times (-1) = 2)$ |
| 011 | $-2^2 \times (0) + 2^1 \times (1) + 2^0 \times (1) = 3$ | 111<br>(111,0) | $2 + 1 + ½ - ½ = 3.5$<br>$(2^1 \times (1) + 2^0 \times (1) + 2^{-1} \times (1) + 2^{-1} \times (-1) = 3)$ |

Referring to Table 3, in the new number system, when there is no 0 indicated after the comma (,), a difference occurs by ½. As described above with reference to Equation 5 to Equation 7, an error of ½ is present at all times between an N-bit sequence including logical values of $S_{N-2}$ to $s_{-1}$ and an N-bit sequence including logical values of $X_{N-1}$ to $x_0$. An error between an N-bit original sequence including logical values of $S_{N-2}$ to $s_{-1}$ and an N-bit encoded sequence including logical values of $X_{N-1}$ to $x_0$ is expressed as a negative LSB. Here, although the negative LSB is omitted, a one-to-one correspondence is established between the original sequence and the encoded sequence. Herein, the original input sequence may be represented as I, an input bit sequence excluding the negative LSB in the new number system may be represented as I', and a sequence including the negative LSB in the new number system may be represented as I". Similarly for a weight, an original weight sequence may be represented as W, a weight bit sequence excluding the negative LSB may be represented as W', and a sequence including the negative LSB may be represented as W".

In an example, the multiplier-accumulator may perform only the aforementioned MSB conversion and may exclude the negative LSB from an arithmetic operation. Instead, the multiplier-accumulator may compensate for accumulation of errors caused by excluding the negative LSB, in a final summation. For example, the multiplier-accumulator may perform a MAC operation between an N-bit input bit sequence including logical values of $s_{N-2}$ to $s_{-1}$ and an M-bit weight bit sequence through the aforementioned XNOR gate and may compensate for the aforementioned error in a summation of partial product results. Here, M denotes an integer of 2 or more and a number of bits of the original weight sequence. For a weight, the multiplier-accumulator may perform encoding of converting an MSB to be similar to an input and may apply, to a multiplication operation, a weight bit sequence that follows the new number system in the original weight sequence. A logical value for each bit position of the input bit sequence may be represented as an input logical value, and a logical value for each bit position of a weight bit sequence may be represented as a weight logical value.

Figure 5:
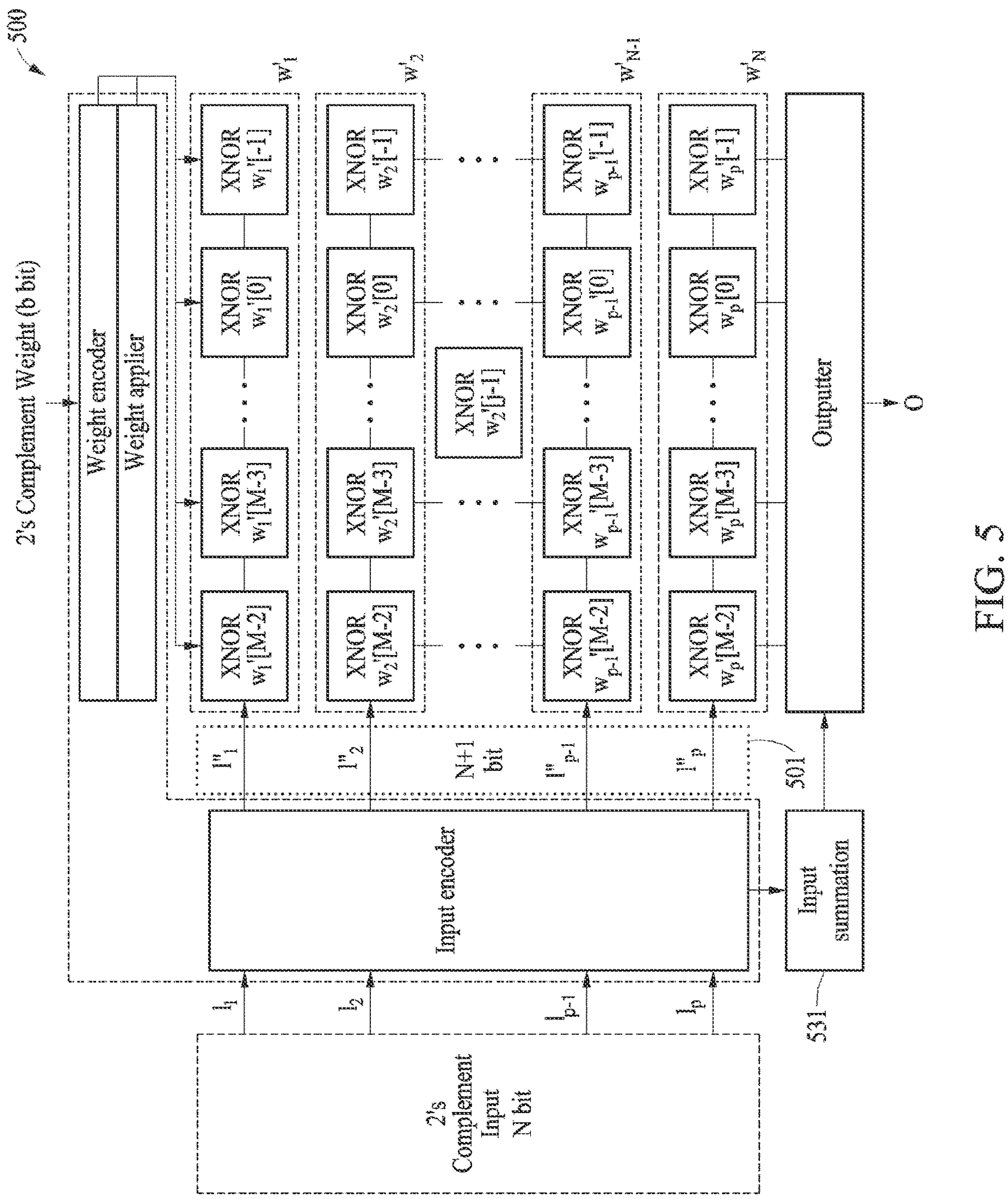
FIGS. 5 and 6 illustrate an example of a multiplier-accumulator circuit.
Figure 6:
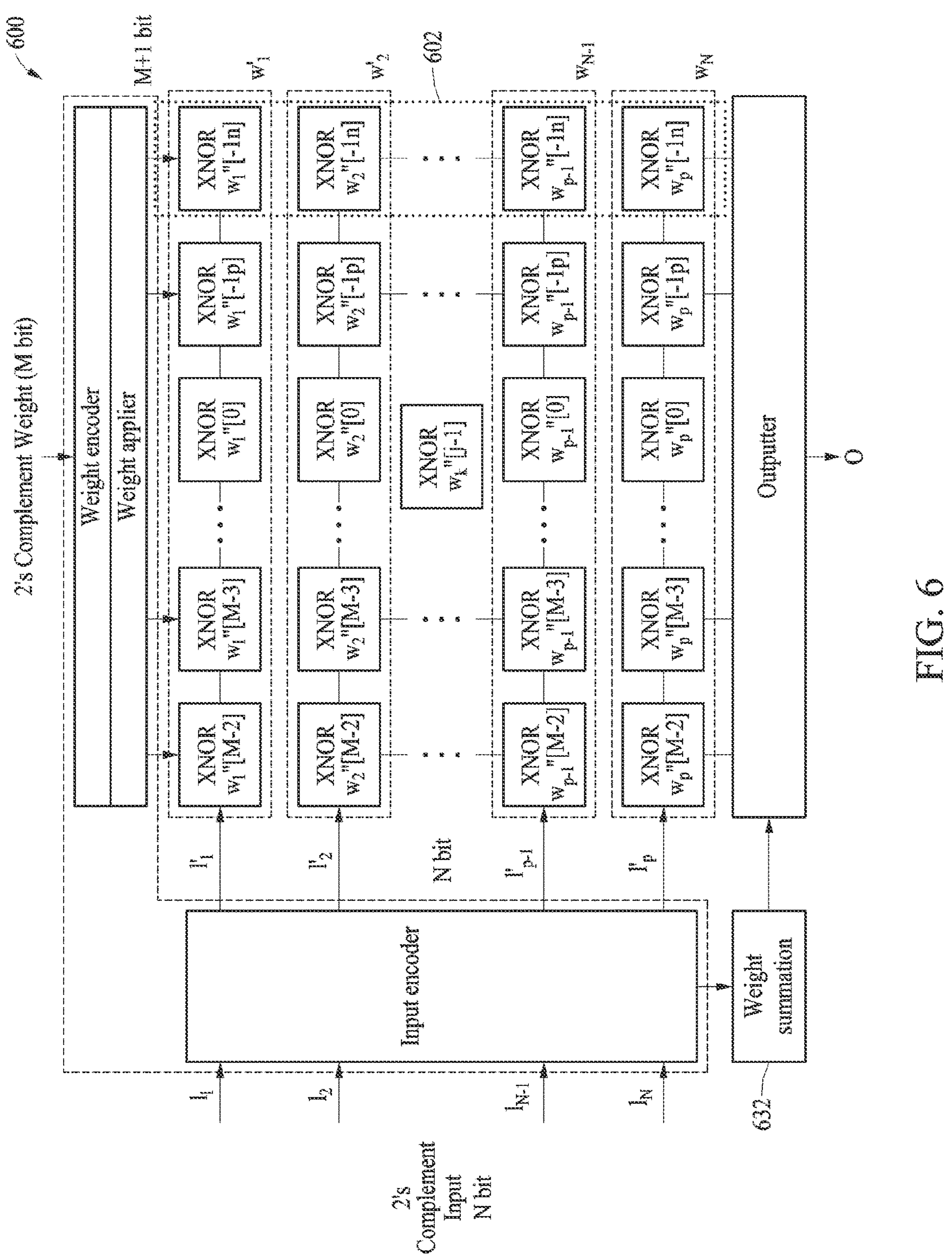

The above error of ½ is a value when the input and the weight are integers, and when there are z fractional parts, an error of $-2^{(-1-z)}$ may occur in each of the input and the weight. Also, although an example of processing both the input and the weight using the new number system is mainly described, it is provided as an example only. Without being limited thereto, only one of the input and the weight may be processed in the new number system as shown in FIGS. 5 and 6.

Referring to Equation 6, the input and the weight may be represented as the following Equation 8, for example. Description is made assuming a single output in Equation 8.

$$I_k = I_k' - \frac{1}{2},\ W_k = W_k' - \frac{1}{2} \text{ for } k = 1, \ldots, P \qquad \text{Equation 8}$$

In Equation 8, $I_k$ denotes a value of a $k^{th}$ original input sequence expressed in 2's complement among P inputs and I'k denotes a value corresponding to an input bit sequence in which an MSB of the $k^{th}$ original input sequence is converted. Here, P denotes an integer of 1 or more and k denotes an integer of 1 or more and P or less. $W_k$ denotes a value of a $k^{th}$ original weight sequence and $W_k'$ denotes a value corresponding to a weight bit sequence in which an MSB of the $k^{th}$ original weight sequence is converted. As described above, since an N-bit original input sequence and/or an M-bit original weight sequence are encoded to an N-bit input bit sequence and an M-bit weight bit sequence, respectively, an error of $-2^{(-1-z)}$ occurs. A weighted sum for output O may be expressed as shown in FIG. 2. FIG. 2 illustrates an operation of compensating for a correction value 207 with respect to accumulation of a multiplication of an MSB position, a multiplication of an $i^{th}$ bit position (290), and a multiplication of an LSB position of an input bit sequence. For example, the multiplication of the $i^{th}$ bit position (290) may be expressed as being decomposed into a cell-wise multiplication (201), a partial product summation for each bit position of weight accumulated for each output line (202) (e.g., accumulation of analog voltage corresponding to partial product results and analog-to-digital (ADV) value of accumulated voltage), a shift for each bit position of a weight (203), a shift by a bit position of an input (204), and an accumulation of the value shifted by the bit position of the input (205). The multiplier-accumulator 200 may perform the multiplication of the $i^{th}$ bit position (290), accumulation to preceding product results of another input bit position (206), and application of the correction value 207 to MAC results of a single output O (207). The multiplier-accumulator 200 may apply a signal corresponding to a logical value of an individual bit position of an input bit sequence to a corresponding XNOR gate 220 along an input line 210 for each cycle. The multiplier-accumulator 200 may output a partial output corresponding to each bit position along an output line 230. Here, order of the multiplication of the $i^{th}$ bit position (290) and remaining operation is not limited as being described above and may vary depending on a design.

Therefore, the multiplier-accumulator may perform a MAC operation between an input and a weight expressed in 2's complement system through encoding that includes the aforementioned MSB conversion. Hereinafter, a non-limiting implementation example of the multiplier-accumulator is described with reference to FIG. 3.

Figure 3:
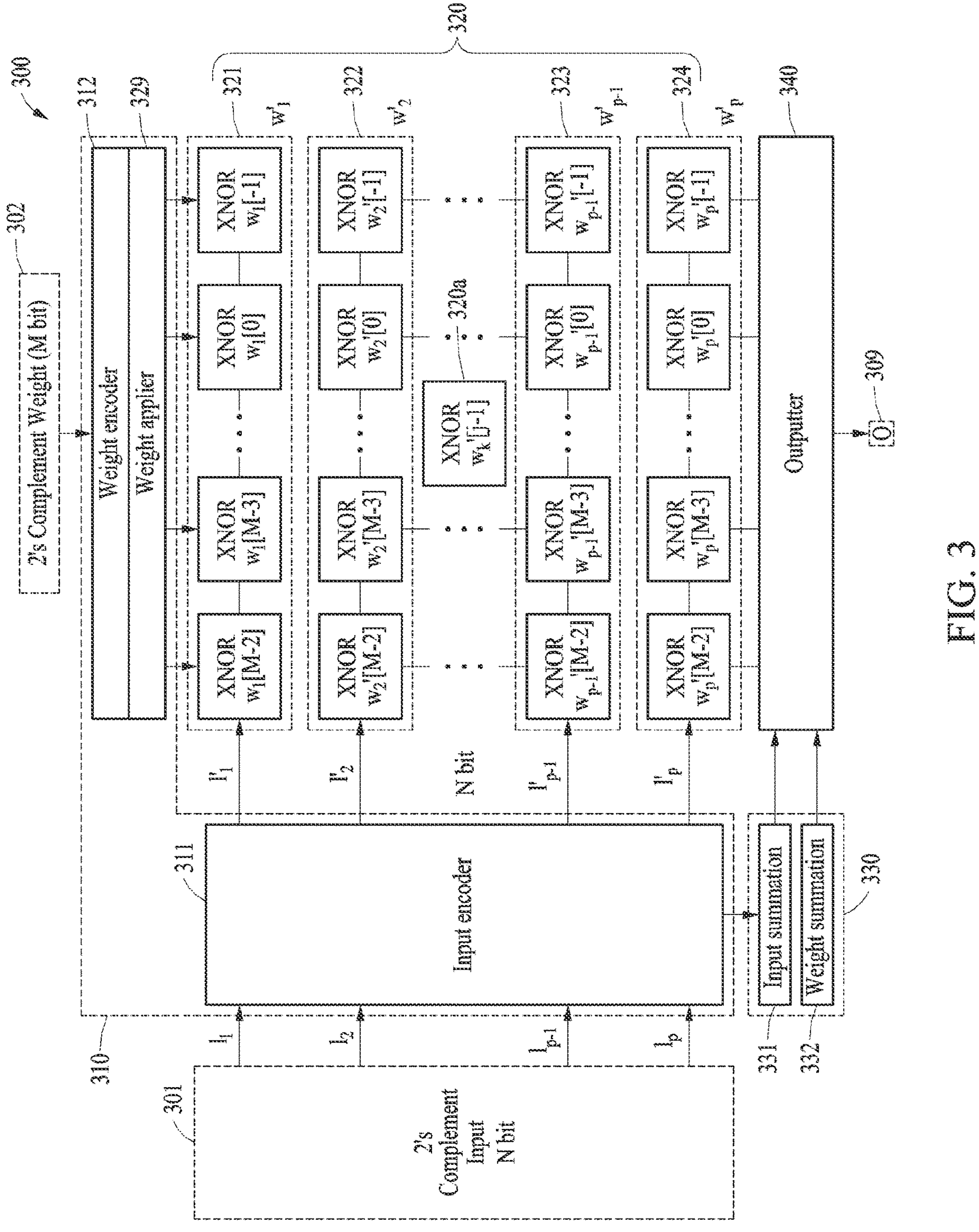
FIG. 3 illustrates an example of a multiplier-accumulator circuit for implementation of a MAC operation according to a number system.

FIG. 3 illustrates an example of a multiplier-accumulator circuit for implementing a MAC operation according to a number system.

Referring to FIG. 3, a multiplier-accumulator 300 may include an encoder 310, a plurality of XNOR gates 320, a correction-related parameter acquirer 330, and an outputter 340.

The encoder 310 may include an input encoder 311, a weight encoder 312, and a weight applier 329. The encoder 310 may apply, to the plurality of XNOR gates 320, a signal corresponding to a sequence in which a logical value of an MSB is converted from an original sequence expressed in 2's complement of a corresponding sequence for at least one of an input bit sequence and a weight bit sequence. The weight applier 329 may write a weight value according to a weight bit sequence of a weight allocated to an individual input and an individual output to a memory cell of a corresponding bit position. For example, the weight applier 329 may receive and store a weight bit sequence (e.g., a sequence in which an MSB of an original weight sequence 302 is converted) from the weight encoder 312 and may apply the same to each XNOR gate. Here, although the weight encoder 312 and the weight applier 329 are illustrated as separate modules in FIG. 3, it is provided as an example only, and the two modules may be integrally implemented according to other non-limiting examples. Hereinafter, for clarity of description, description is made based on an example in which the weight applier 329 is integrated into the weight encoder 312. In a non-limiting example, each of the encoder 310, the correction-related parameter acquirer 330, and the outputter 340 may be, may include, or may be included in one or more processors of the multiplier-accumulator 300.

The input encoder 311 may sequentially receive an original input sequence 301 expressed in 2's complement of the input bit sequence for each bit position. In response to receiving the MSB, the input encoder 311 may apply a signal corresponding to a value in which the logical value of the MSB is converted to the plurality of XNOR gates 320 provided to an input line corresponding to the input bit sequence. The input encoder 311 may sequentially transmit a signal corresponding to a logical value of the input bit sequence including the same number of bits as a number of bits N of the original input sequence to the plurality of XNOR gates 320 during a cycle corresponding to the number of bits N of the original input sequence.

For example, the input encoder 311 may independently apply an input for each input line. For example, in FIG. 3, $I'_k$ denotes an input bit sequence that is applied to a $k^{th}$ input line among P input lines. The input encoder 311 may perform encoding N times for logical values of the N-bit original input sequence 301 $I_k$. Encoding of the input encoder 311 may represent an operation of generating a signal corresponding to a logical value of the input bit sequence $I'_k$ from the logical value of the original input sequence 301 lk. The input encoder 311 may generate the N-bit input bit sequence $I'_k$ through encoding of converting the MSB of the N-bit original input sequence 301 $I_k$. The input encoder 311 may sequentially apply logical values of the input bit sequence $I'_k$ to a corresponding input line from an MSB to an LSB per cycle. For example, in a cycle corresponding to an $i^{th}$ bit position among N cycles, a logical value $s'_k$ [i-1] corresponding to an $i^{th}$ bit position of a $k^{th}$ input may be applied to an input line. Although conversion of a logical value is explained for clarity of description, conversion of the logical value may not be explicitly performed in actual implementation. For example, while receiving the original input sequence 301 for each cycle, the input encoder 311 may apply, to a memory cell, a signal in which only a logical value corresponding to an MSB is inverted and may apply a signal corresponding to a logical value of the original input sequence 301 to a remaining bit position.

Also, the input encoder 311 may apply an analog signal corresponding to a logical value for each bit position of the input bit sequence corresponding to the input line to the plurality of XNOR gates 320 provided along the input line in a corresponding cycle. The analog signal may refer to a signal corresponding to the logical value and may be classified into a signal representing a logical value of 0 and a signal representing a logical value of 1. The analog signal may be a voltage signal and/or a current signal. However, it is provided as an example only. For example, the analog signal may have a high-level voltage VH for the logical value of 1 and/or may have a low-level voltage VL for the logical value of 0. The analog signal may apply similarly to a weight bit sequence, which is described below. A non-limiting example of applying an input signal according to an input line and an output line is described with reference to FIG. 4.

The weight encoder 312 may set a weight bit sequence to an XNOR gate provided along the input line for each bit position. The weight encoder 312 may encode logical values of the M-bit original weight sequence 302 $W_k$. Encoding of the weight encoder 312 may represent an operation of generating a signal corresponding to a logical value of a weight bit sequence $W'_k$ from the logical value of the original weight sequence 302 $W_k$. For example, the weight encoder 312 may set, to an XNOR gate of a corresponding bit position, each logical value of a weight bit sequence in which only an MSB is converted in the original weight sequence 302. Weight logical values may be independently set for each input. In FIG. 3, a weight logical value $w_k'$[j-1] applied to a target XNOR gate 320*a* may represent a logical value of a $j^{th}$ bit position of a weight bit sequence applied to a $k^{th}$ input among P inputs. For example, the weight encoder 312 may apply a signal corresponding to a weight value (e.g., a weight logical value) for each bit position of the weight bit sequence in a single input line to a memory cell (e.g., XNOR gate) of a corresponding bit position.

Although FIG. 3 illustrates an example in which all of the input encoder 311 and the weight encoder 312 convert only an MSB of an original sequence and apply a bit sequence including the same number of bits as a number of bits of the original sequence to memory cells in a crossbar array structure, it is provided as an example only. In the following, a non-limiting example in which the input encoder 311 additionally applies an input logical value corresponding to a negative LSB is described with reference to FIG. 5 and a non-limiting example in which the weight encoder 312 further includes an output line corresponding to a negative LSB is described with reference to FIG. 6.

The plurality of XNOR gates 320 may be provided along at least one input line. P input lines may be provided for P inputs. An XNOR gate 321 provided along a first input line may receive a first input through the first input line, an XNOR gate 322 provided along a second input line may receive a second input through the second input line, an XNOR gate 323 provided along a $(P-1)^{th}$ input line may receive a $(P-1)^{th}$ input through the $(P-1)^{th}$ input line, and an XNOR gate 324 provided along a $P^{th}$ input line may receive a $P^{th}$ input through the $P^{th}$ input line.

The plurality of XNOR gates 320 may receive signals corresponding to the input bit sequence and the weight bit sequence corresponding to each input line. The plurality of XNOR gates 320 may output partial product results between the input bit sequence and the weight bit sequence. XNOR gates provided along the same input line among at least one input line may be connected to the same input line and may receive an input logical value corresponding to a bit position of a corresponding cycle per cycle in the same input bit sequence.

Also, the plurality of XNOR gates 320 may be provided along a plurality of output lines. A number of the plurality of output lines may correspond to a number of bits of the weight bit sequence. For example, M output lines may be provided for an M-bit weight bit sequence. A logical value of a $j^{th}$ bit position of a weight sequence may be set to an XNOR gate provided along an output line corresponding to the $j^{th}$ bit position among M output lines. Although FIG. 3 illustrates M output lines for a single output, it is provided as an example only. The plurality of XNOR gates 320 may be provided along an input line for an input bit sequence for each bit position allocated to a plurality of output lines grouped for a single operation (e.g., a single output) of multiplication and accumulation. For example, in the case of calculating V outputs from P inputs, M output lines may be grouped for each of the V outputs. That is, among the V outputs, an $I^{th}$ output may be a summation of partial product results by an XNOR accumulated through the M output lines.

The correction-related parameter acquirer 330 may acquire a parameter related to a correction value for compensating for an error that occurs in the new number system. For example, the correction-related parameter acquirer 330 may include an input summation 331 and a weight summation 332. The multiplier-accumulator 300 may record a sum of weights individually set to the plurality of XNOR gates 320 for multiplication and accumulation. The correction-related parameter acquirer 330 may pre-calculate and store a sum of weights applied for each input of each output. Also, the correction-related parameter acquirer 330 may calculate a sum of the input bit sequence output from the input encoder 311. For example, the correction-related parameter acquirer 330 may read an input logical value of the input bit sequence every cycle and may calculate and store a sum of inputs based on a bit position of a corresponding cycle and the input logical value. Also, the correction-related parameter acquirer 330 may store a total number P of inputs.

The outputter 340 may generate the output 309 O in which a correction value is applied to operation results in which partial product results output from the plurality of XNOR gates 320 are summed. The outputter 340 may determine the correction value based on the correction-related parameter. For example, the outputter 340 may generate an output O based on a summation of partial product results between the input bit sequence and the weight bit sequence, a sum of inputs, a sum of weights, and an offset value based on a number of inputs. The outputter 340 may be implemented as a read circuit, which is described below with reference to FIGS. 9A to 9D. An operation of the outputter 340 may be represented as the following Table 4, for example.

TABLE 4

| Operation of outputter | |
|---|---|
| $\sum_{k=1}^{P} I_k' W_k' - \frac{1}{2}\sum_{k=1}^{P} I_k' - \frac{1}{2}\sum_{k=1}^{P} W_k' + \frac{P}{4}$ | |
| $\sum_{k=1}^{P} I_k' W_k'$ | Results of a MAC operation between an N-bit input bit sequence and an M-bit weight bit sequence as operation results in which partial product results output from a plurality of XNOR gates are summed. |
| $\sum_{k=1}^{P} I_k'$ | A sum of an N-bit input bit sequence as a parameter related to a second correction value |
| $\sum_{k=1}^{P} W_k'$ | A sum of an M-bit weight bit sequence as a parameter related to a first correction value |
| | A third correction value that is a constant determined based on a number P of inputs |

For example, the outputter 340 may apply the first correction value that is determined based on a sum of weights set to the plurality of XNOR gates 320 for operation results, to the operation results in which the partial product results are summed. For example, the outputter 340 may subtract, from the operation results, the first correction value that is determined as a half of the sum of the weights. Also, the outputter 340 may apply a second correction value that is determined based on a sum of at least one input bit sequence to the operation results in which the partial product results are summed. For example, the outputter 340 may subtract, from the operation results, the second correction value that is determined as a half of the sum of the at least one input bit sequence. When the encoder 310 includes the input encoder 311 configured to encode the original input sequence 301 and the weight encoder 312 configured to encode the original weight sequence 302, the outputter 340 may apply a third correction value based on the number of inputs to the operation results. For example, the outputter 340 may add, to the operation results, the third correction value that is determined as a value acquired by dividing the number of inputs by 4.

In an example, the multiplier-accumulator 300 of one or more embodiments may perform a MAC operation without adding a bit to the N-bit original input sequence 301 expressed in 2's complement and the M-bit original weight sequence 302 expressed in 2's complement. That is, the multiplier-accumulator 300 of one or more embodiments may perform a multiplication operation using the N-bit input bit sequence 301 and the M-bit weight bit sequence 302 and thus, may have a further increased operation speed and a reduced area, compared to a typical multiplier-accumulator.

Figure 8:
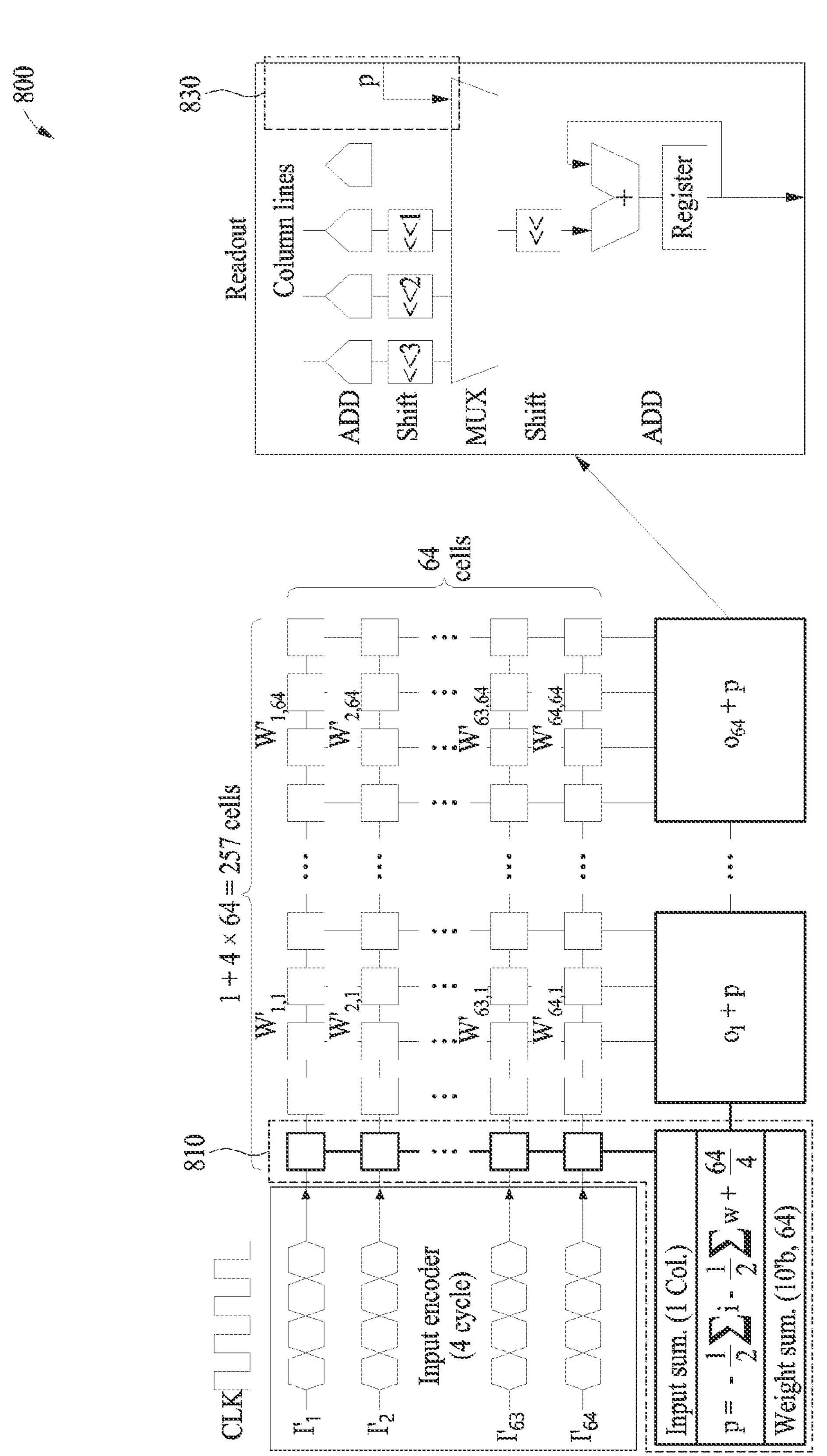
FIG. 8 illustrates an example of determining a correction value in a multiplier-accumulator circuit.

In the example of FIG. 3, every time calculation of an output for a node of a subsequent layer is completed in a single layer of a neural network, the multiplier-accumulator 300 may set a weight for an output for another node of the subsequent layer to the plurality of XNOR gates 320. However, it is provided as an example only. Referring to FIG. 8, there may be a multiplier-accumulator that has an output line group for at least one output.

Figure 4:
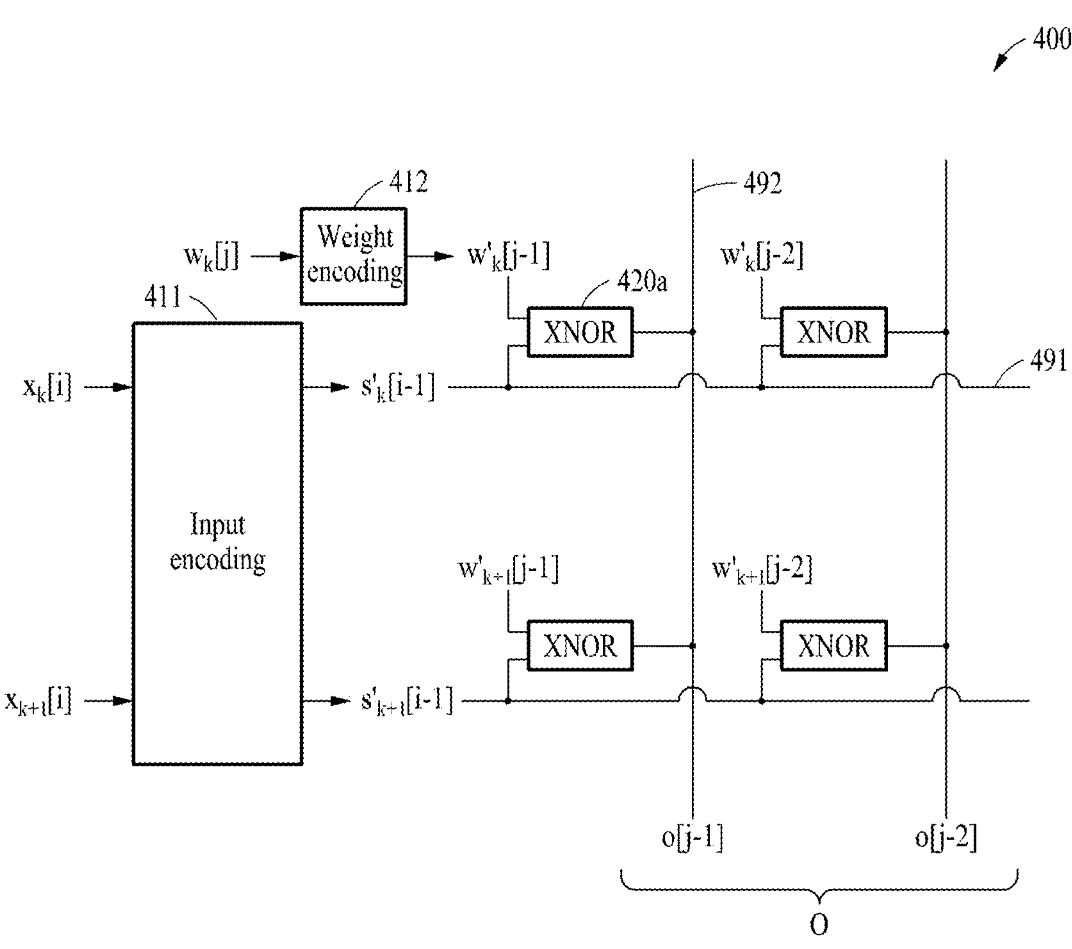
FIG. 4 illustrates an example of an input line and an output line connected to an XNOR gate in a multiplier-accumulator circuit.

FIG. 4 illustrates an example of an input line and an output line connected to an XNOR gate in a multiplier-accumulator circuit.

In an example, a multiplier-accumulator 400 may receive P inputs through P input lines. The multiplier-accumulator 400 may perform input encoding 411 for an input and weight encoding 412 for a weight. In FIG. 4, description is made for clarity of explanation based on a $k^{th}$ input line and a $(k+1)^{th}$ input line and a $j^{th}$ output line and a $(j+1)^{th}$ output line. Here, when the input and the weight are integers, an LSB of each of an input bit sequence and a weight bit sequence represents a 2-1 bit position. An LSB of an output bit sequence corresponding to product results between the input bit sequence and the weight bit sequence may represent a 2-2 bit position. Therefore, an output that is multiplication and accumulation results between an $i^{th}$ input bit sequence and a $j^{th}$ weight bit sequence may represent a i+j-2 bit position. The multiplier-accumulator 400 may set, to an XNOR gate, a weight logical value corresponding to each bit position of a weight that is set every P inputs. For example, an input encoder may apply a logical value (e.g., $s_k'[i-1]$) of an $i^{th}$ bit position in a $k^{th}$ input bit sequence to a target XNOR gate 420*a* to which a logical value (e.g., $w_k'[j-1]$) of a $j^{th}$ bit position in a $k^{th}$ weight bit sequence is applied.

The multiplier-accumulator 400 may perform a summation of a partial product corresponding to a bit position corresponding to a corresponding output line by accumulating an analog signal representing XNOR results output from XNOR gates connected to the same output line 492 among the plurality of XNOR gates. The multiplier-accumulator 400 may apply a signal corresponding to a logical value corresponding to a single cycle among logical values of an input bit sequence input to an input line 491 with an XNOR gate 420*a* that is provided along the corresponding input line 491.

FIGS. 5 and 6 illustrate another example of a multiplier-accumulator circuit.

Although an example in which both an input bit sequence and a weight bit sequence maintain the same number of bits as a number of bits of an original sequence is described, it is provided as an example only.

FIG. 5 illustrates an example in which a weight encoder encodes an M-bit original weight sequence W to an M-bit weight bit sequence W' and an input encoder encodes an N-bit original input sequence I to an (N+1)-bit input bit sequence 501 I" including a negative LSB.

A multiplier-accumulator 500 may calculate an input summation 531 of an (N+1)-bit input bit sequence 501 including a negative LSB. Referring to the following Table 5, an outputter may generate a compensated output by subtracting a half of a second correction value based on a sum of (N+1)-bit input bit sequences 501 from an accumulation of partial product results. In the structure of FIG. 5, since an operation may be performed using an M-bit weight bit sequence, M XNOR gates may be used for each input for a single output and an area may be reduced accordingly.

TABLE 5

| Another operation method of outputter | |
|---|---|
| $\sum_{k=1}^{P} I''_k W_k' - \frac{1}{2}\sum_{k=1}^{P} I''_k$ | |
| $\sum_{k=1}^{P} I''_k W_k'$ | Results of a MAC operation between an (N + 1)-bit input bit sequence and an M-bit weight bit sequence |
| $\sum_{k=1}^{P} I''_k$ | A sum of (N + 1)-bit input bit sequences as a parameter related to a second correction value |

FIG. 6 illustrates an example in which a weight encoder encodes an M-bit original weight sequence W to an (M+1)-bit weight bit sequence W" including a negative LSB and an input encoder encodes an N-bit original input sequence I to an N-bit input bit sequence I'. In FIG. 6, an XNOR gates 602 to which a weight corresponding to a negative LSB is set may be added compared to the structures of FIGS. 3 and 5. In FIG. 6, the negative LSB indicated as −1n and a positive LSB indicated as −1p may represent a bit position of $-2^{-1}$ and a bit position of $+2^{-1}$, respectively.

The multiplier-accumulator 600 may calculate a weight summation 632 of the (M+1)-bit weight bit sequence W" including the negative LSB. Referring to the following Table 6, an outputter may generate a compensated output by subtracting a half of a first correction value based on a sum of (M+1)-bit weight bit sequences from an accumulation of partial product results. In the structure of FIG. 6, since an operation may be performed using an N-bit input bit sequence, a MAC operation may be performed in N cycles and an operation speed may be improved accordingly.

TABLE 6

| Still another operation method of outputter | |
|---|---|
| $\sum_{k=1}^{P} I_k' W''_k - \frac{1}{2}\sum_{k=1}^{P} W''_k$ | |
| $\sum_{k=1}^{P} I_k' W''_k$ | Results of a MAC operation between an N-bit input bit sequence and an (M + 1)-bit weight bit sequence |
| $\sum_{k=1}^{P} W''_k$ | A sum of (M + 1)-bit weight bit sequences as a parameter related to a first correction value |

Figure 7:
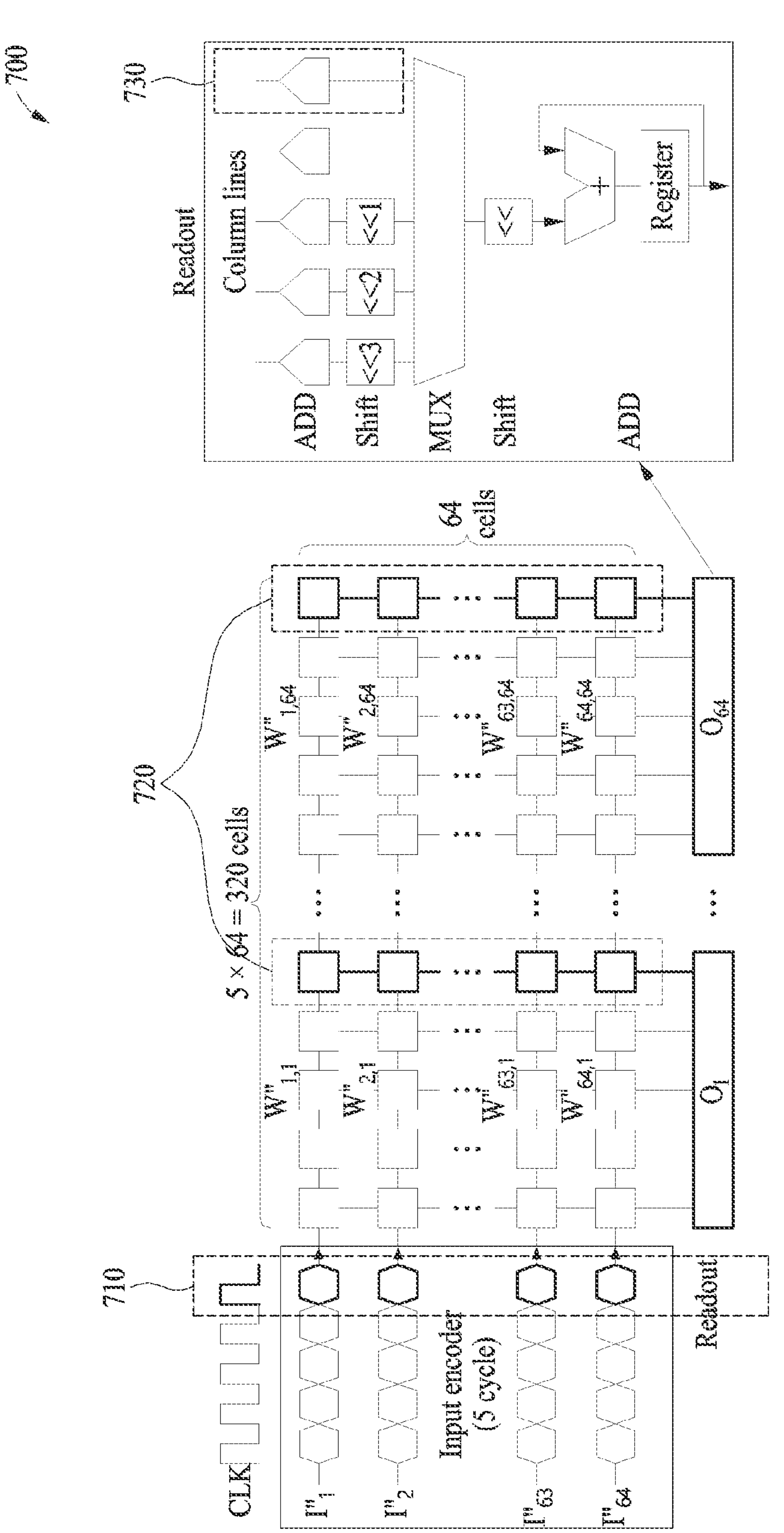
FIG. 7 illustrates a comparative example for a MAC operation in 2's complement system.

FIG. 7 illustrates a comparative example for a MAC operation in 2's complement system.

In the comparative example of FIG. 7, an example in which each of an input and a weight according to 2's complement system is encoded as a sequence including a negative LSB is described for actual explanation. For example, in a circuit 700 of FIG. 7, an (N+1)-bit input bit sequence and an (M+1)-bit weight bit sequence may be used. That is, since the circuit 700 includes an addition operation 710 and an additional 1-bit cell 720 of one cycle compared to an original sequence, an operation time and an area may increase. Also, an outputter may use an additional element 730 to process the negative LSB.

FIG. 8 illustrates an example of determining a correction value in a multiplier-accumulator circuit.

In an example, a plurality of XNOR gates may be provided in the same number as a number of bits of an original weight sequence for an individual output for each input line. A multiplier-accumulator circuit 800 may include an additional memory cell 810 provided along an additional line distinct from an output line for input summation. The multiplier-accumulator circuit 800 may include an XNOR gate having a logical value weight of 1 as the additional memory cell 810 and may acquire an input summation by accumulating an input value of a corresponding bit position per cycle using the additional memory cell 810. For example, in response to applying an input logical value to XNOR gates for each bit position of at least one input bit sequence for multiplication and accumulation, a multiplier-accumulator may calculate a sum of the at least one input bit sequence by summing the input logical value for each bit position based on a corresponding bit position.

The multiplier-accumulator circuit 800 in the structure of FIG. 8 may include at least one output line grouped for each node of a plurality of nodes of a subsequent layer connected to a single layer of a neural network. The multiplier-accumulator circuit 800 may set a weight logical value to an XNOR gate for each at least one output line and may perform multiplication and accumulation in parallel in a plurality of nodes of the subsequent layer. An outputter may further include a line 830 configured to receive a correction value p. The following Table 7 relates to a structure-specific comparison of an accumulated multiplication operation for 4 bits of 64 inputs and 64 outputs.

TABLE 7

| | Comparative example of FIG. 7 | Example of FIG. 3 | Example of FIG. 5 | Example of FIG. 6 |
|---|---|---|---|---|
| Memory Macro Area | 1 | 0.8 | 0.8 | 1 |
| Energy Efficiency | 1 | 1.5625 | 1.25 | 1.25 |
| Additional component | N/A | Input summation circuit/ weight storage circuit | Input summation circuit | Weight storage circuit |

Referring to Table 7, the multiplier-accumulator 800 may have a crossbar structure with an enhanced energy efficiency and area efficiency in terms of the same performance (e.g., the same operation processing speed and the same operation amount). An XNOR gate of the multiplier-accumulator circuit 800 may be implemented as various memory devices (e.g., a static RAM (SRAM), a magnetic RAM (MRAM), a resistive RAM (RRAM), and a phase-change RAM (PRAM)).

FIGS. 9A to 9D illustrate examples of a MAC operation between a 4-bit input sequence and a 4-bit weight sequence in a multiplier-accumulator circuit.

For example, an example of a MAC operation between an input and a weight shown in Table 8 is described with reference to FIGS. 9A to 9D. Here, description is made based on an example in which 11=−4, W1=5, 12=−1, W2=−6, 13=6, W3=−3, 14=2, W4=−5, 15=5, and W5=4. In the following Table 8, 11', 12', 13', 14', 15', W1', W2', W3', W4', and W5' may represent logical values of an MSB-converted sequence from an original sequence. In the above example, an operation value may be output as −22.

In an example, an outputter 940 may include an analog-to-digital converter (ADC) 941, a first bit-shifter 942, a multiplexer (MUX) 943, a second bit-shifter 944, and an accumulator 945.

The ADC 941 may map a bit value of 0 to $P*(V_H+V_L)/2$. The ADC 941 may change a bit value of 0.25 per $|V_H-V_L|/2$. Here, $0.25=(½)^{-2}$ is an example in which an input and an output are integers. When a number of fractional parts of the input and the output is z, a bit value of $(½)^{-2-z}$ may vary per $|V_H-V_L|/2$. Here, $V_H$ denotes a voltage mapped when an output of an XNOR gate is a logical value of 1 and $V_L$ denotes a voltage mapped when an output of an XNOR gate is a logical value of 0.

The first bit-shifter 942 may perform a shift operation to express a number of digits of a weight. The MUX 943 may select a bit value of a single bit position to be summed from among bit positions in a weight. The second bit-shifter 944 may perform a shift operation to express a bit position of an input. For example, referring to FIG. 9A, since it is an operation 900*a* of a fourth bit position from an LSB, the second bit-shifter 944 may perform shift three times. The accumulator 945 may operate M times during a single cycle and may sum partial product results of output lines grouped for a single output based on a bit position.

Figure 9A:
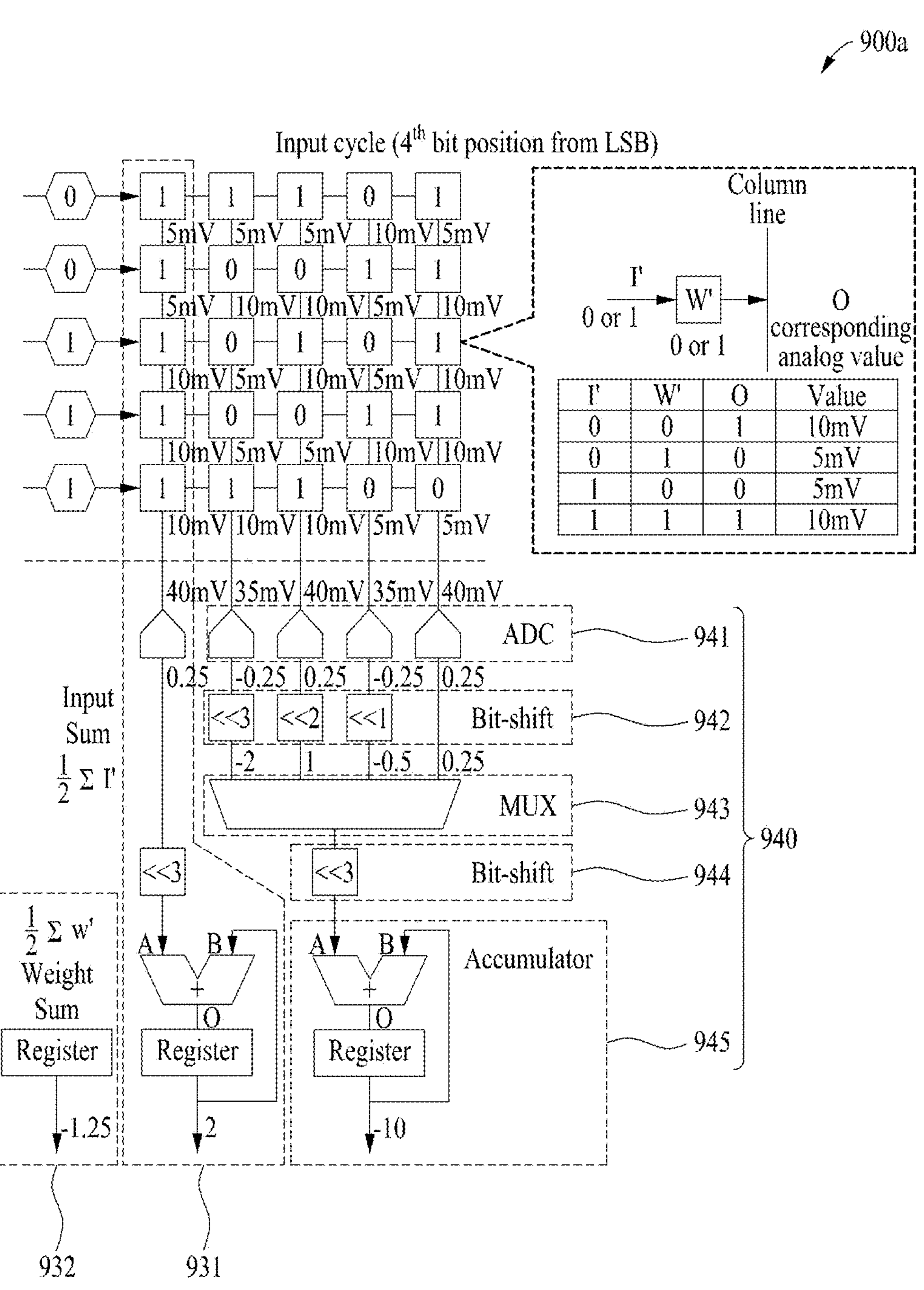
FIGS. 9A to 9D illustrate examples of a MAC operation between a 4-bit input sequence and a 4-bit weight sequence in a multiplier-accumulator circuit.

FIG. 9A illustrates the operation 900*a* of the fourth bit position from the LSB. When input/output of an adder included in the accumulator 945 is defined as (A, B, O), (−2*8, 0,−16), (1*8,−16,−8), (−0.5*8,−8,−12), and (0.25*8,−12,−10) may sequentially appear during a single cycle. That is, the accumulator 945 may calculate-10 as a summation of partial multiplication results corresponding to an MSB of the input. Also, in the input summation circuit 931, the adder may operate once and, using (0.25*8, 0, 2), a half of a sum of MSBs of the input may be determined as 2.

Figure 9B:
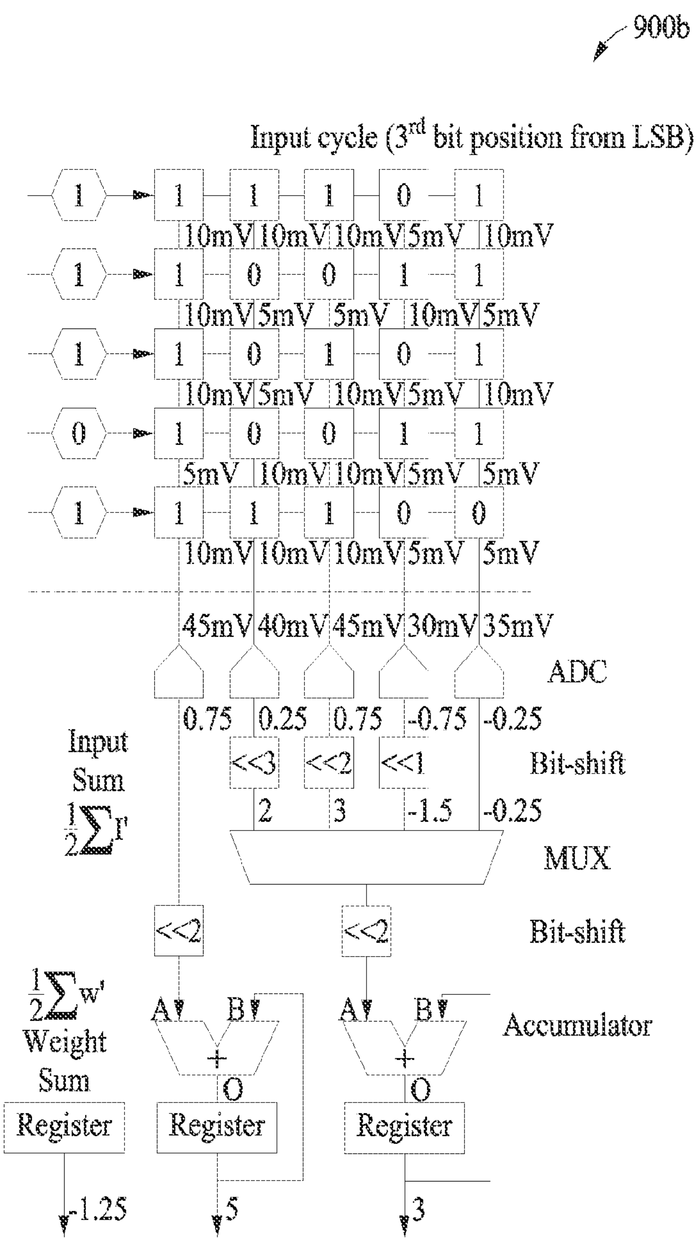

FIG. 9B illustrates an operation 900*b* of a third bit position from an LSB. An adder of the accumulator 945 may operate using (2*4,−10,−2), (3*4,−2, 10), (−1.5*4, 10, 4), and (−0.25*4, 4, 3) during a single cycle and may output 3 as a summation of partial product results corresponding to the third bit position from the LSB and previous accumulated results. An adder of the input summation circuit 931 may output 2+0.75*4=5 as a half of a sum of inputs corresponding to the third bit position from the LSB.

TABLE 8

| | Bit position | | | | | | Bit position | | | | | |
|---|---|---|---|---|---|---|---|---|---|---|---|---|
| input | [3] | [2] | [1] | [0] | SUM | Weight | [3] | [2] | [1] | [0] | SUM | Product |
| I1' | 0 | 1 | 0 | 0 | −3.5 | W1' | 1 | 1 | 0 | 1 | 5.5 | −19.25 |
| I2' | 0 | 1 | 1 | 1 | −0.5 | W2' | 0 | 0 | 1 | 0 | −5.5 | 2.75 |
| I3' | 1 | 1 | 1 | 0 | 6.5 | W3' | 0 | 1 | 0 | 1 | −2.5 | −16.25 |
| I4' | 1 | 0 | 1 | 0 | 2.5 | W4' | 0 | 0 | 1 | 1 | −4.5 | −11.25 |
| I5' | 1 | 1 | 0 | 1 | 5.5 | W5' | 1 | 1 | 0 | 0 | 4.5 | 24.75 |
| | | | | | 10.5 | | | | | | −2.5 | −19.25 |

Final output = −19.25 − ½x(10.5)−1/2x(−2.5) + 5/4 = −22

As described above, a weight storage circuit 932 may pre-store a sum of weights and an input summation circuit 931 may calculate an input summation by repeatedly shifting and adding an input bit value based on a corresponding bit position every cycle. Referring to the example of FIGS. 9A to 9D, a half of an input summation and a half of a weight summation may be immediately determined at a circuit level.

Figure 9C:
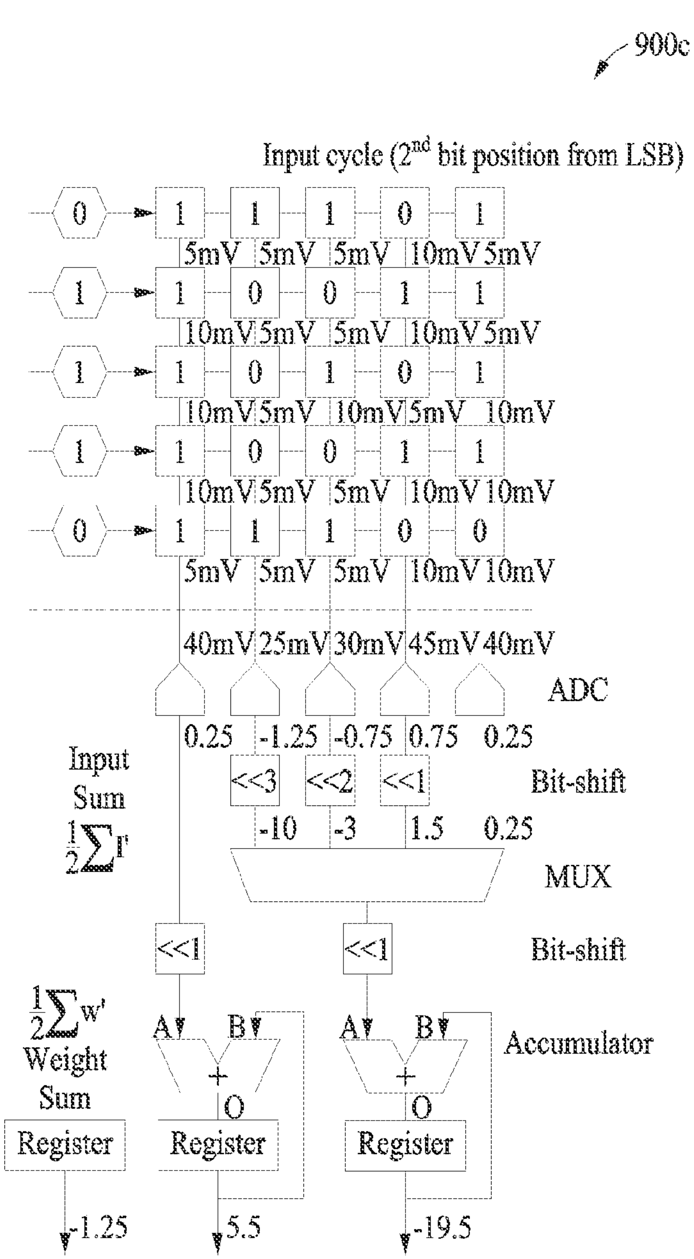

FIG. 9C illustrates an operation 900*c* of a second bit position from an LSB. An adder of the accumulator 945 may operate using (−10*2, 3,−17), (−3*2,−17,−23), (1.5*2,−23,−20), and (0.25*2,−20,−19.5) during a single cycle and may output −19.5 as a summation of partial product results corresponding to the second bit position from the LSB and previous accumulated results. An adder of the input summation circuit 931 may output 5+0.25*2=5.5 as a half of a sum of inputs corresponding to the second bit position from the LSB.

Figure 9D:
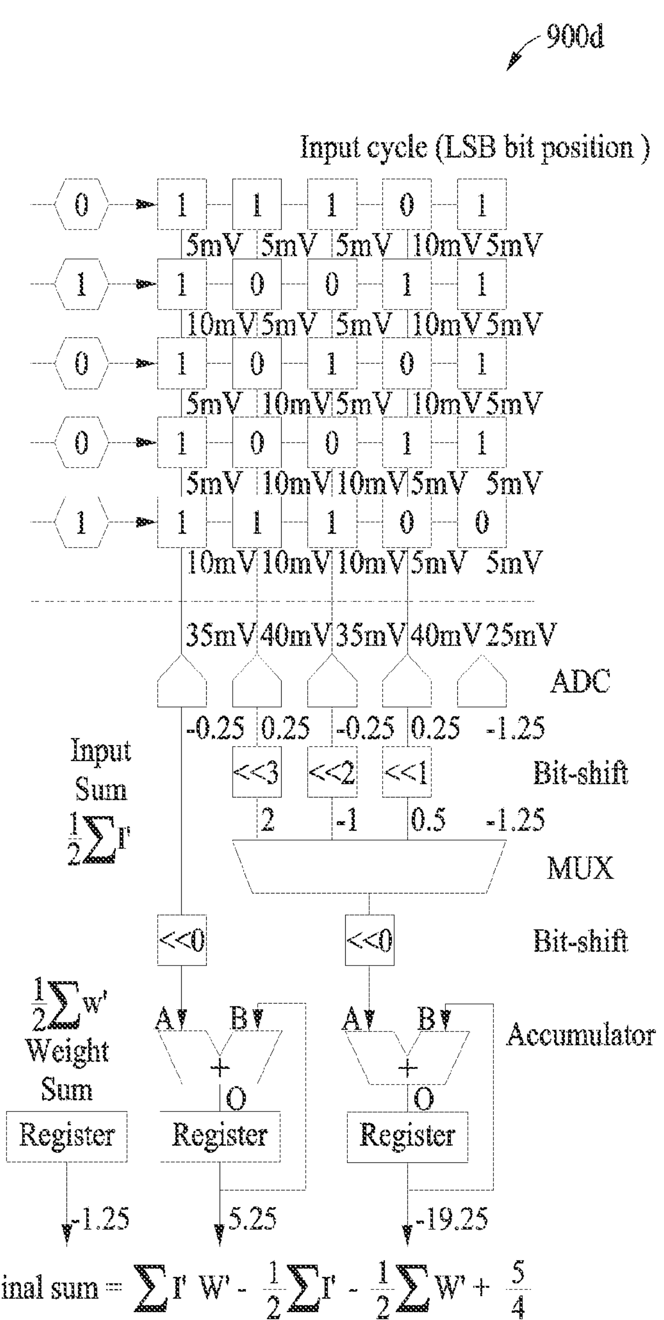

FIG. 9D illustrates an operation 900*d* of an LSB. An adder of the accumulator 945 may operate using (2,−19.5,−17.5), (−1,−17.5,−18.5), (0.5,−18.5,−18), and (−1.25,−18,−19.25) during a single cycle and may output −19.25 as a summation of partial product results corresponding to the LSB and previous accumulated results. An adder of the input summation circuit 931 may output 5.5-0.25=5.25 as a half of a sum of inputs corresponding to the LSB.

The multiplier-accumulator circuit may obtain a final output of −22 by subtracting 5.25 which is the half of the sum of inputs from −19.25 which is the summation of the partial product results, subtracting −1.25 which is the half of the weighted sum, and adding 1.25 which is the correction value based on the number of inputs. There is no limit to the number system for bit-shifting and the addition operation after the output of the ADC 941, and the aforementioned new number system, 2's complement system, and other number systems may also be applied.

Figure 10:
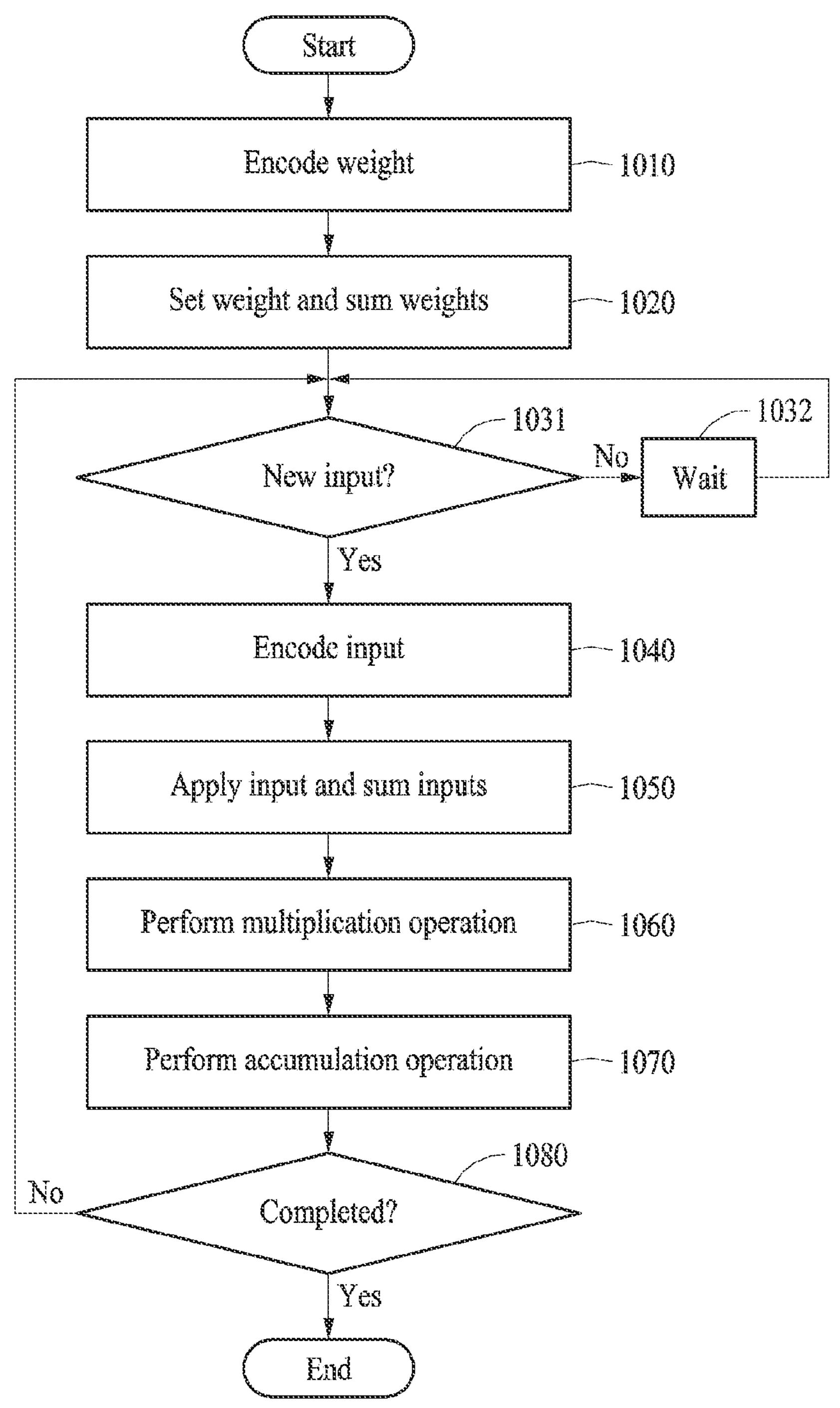
FIG. 10 is a flowchart illustrating an example of a computing device and a method using a multiplier-accumulator.

FIG. 10 is a flowchart illustrating an example of a computing device and a method using a multiplier-accumulator.

In an example, the multiplier-accumulator may apply, to a plurality of XNOR gates corresponding to each input line, a signal corresponding to a sequence in which a logical value of an MSB is converted from an original sequence expressed in 2's complement of a corresponding sequence for at least one of an input bit sequence and a weight bit sequence.

For example, in operation 1010, the multiplier-accumulator may encode a weight. The multiplier-accumulator may convert an MSB of an original weight sequence.

In operation 1020, the multiplier-accumulator may set a weight to each of the plurality of XNOR gates and may sum weights.

In operation 1031, the multiplier-accumulator may determine whether a new input is present. In operation 1032, the multiplier-accumulator may wait until the new input is received.

In operation 1040, the multiplier-accumulator may encode an input. For example, the multiplier-accumulator may convert an MSB of an original input sequence.

In operation 1050, the multiplier-accumulator may apply a converted input sequence for each bit position every cycle and may sum the inputs.

In response to the plurality of XNOR gates receiving signals corresponding to an input bit sequence and a weight bit sequence corresponding to a corresponding input line, the multiplier-accumulator may output partial product results between the input bit sequence and the weight bit sequence. For example, in operation 1060, the multiplier-accumulator may perform a multiplication operation using an XNOR gate. In operation 1070, the multiplier-accumulator may perform an accumulation operation by accumulating output voltage of the XNOR gate.

In operation 1080, the multiplier-accumulator may determine whether a MAC operation is completed for all the bit positions. The multiplier-accumulator may generate an output in which a correction value is applied to operation results in which partial product results output from the plurality of XNOR gates are summed.

The multiplier-accumulator may also perform the operations of FIGS. 1 to 9D without being limited to the operations of FIG. 10.

In an example, the multiplier-accumulator may apply to all MAC operations using an XNOR operation in addition to neural network computing.

The crossbar array structures, XNOR gates, multiplier-accumulators, input lines, output lines, encoders, correction-related parameter acquirer 330, outputters, input encoders, weight encoders, weight appliers, target XNOR gates, circuits, 1-bit cells, elements, multiplier-accumulator circuits, memory cells, lines, input summation circuits, weight storage circuits, ADCs, first bit-shifters, MUXs, second bit-shifters, accumulators, crossbar array structure 102, XNOR gate 110, multiplier-accumulator 200, input line 210, XNOR gate 220, output line 230, multiplier-accumulator 300, encoder 310, XNOR gates 320, correction-related parameter acquirer 330, outputter 340, input encoder 311, weight encoder 312, weight applier 329, XNOR gate 321, XNOR gate 323, XNOR gate 324, target XNOR gate 320*a*, multiplier-accumulator 400, input line 491, XNOR gate 420*a*, output line 492, multiplier-accumulator 500, multiplier-accumulator 600, circuit 700, 1-bit cell 720, element 730, multiplier-accumulator circuit 800, memory cell 810, line 830, input summation circuit 931, weight storage circuit 932, outputter 940, ADC 941, first bit-shifter 942, MUX 943, second bit-shifter 944, accumulator 945, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A multiplier-accumulator comprising:

a plurality of exclusive negative OR (XNOR) gates provided along one or more input lines and configured to receive signals corresponding to an input bit sequence and a weight bit sequence corresponding to each of the one or more input lines and to output partial product results between the input bit sequence and the weight bit sequence;

an encoder configured to apply, to the plurality of XNOR gates, a signal corresponding to a sequence in which a logical value of a most significant bit (MSB) is inverted from an original sequence expressed in 2's complement of a corresponding sequence for either one or both of the input bit sequence and the weight bit sequence; and an outputter configured to generate an output in which a correction value is applied to operation results in which the partial product results output from the plurality of XNOR gates are summed, wherein the original sequence expressed in 2's complement is inverted to a number system having bit values of only −1 and +1, the input bit sequence and the weight bit sequence are expressed in the number system having bit values of only −1 and +1, and wherein the encoder comprises an input encoder configured to:

sequentially receive an original input sequence expressed in 2's complement of the input bit sequence for each bit position; and in response to receiving the MSB, apply a signal corresponding to a value in which the logical value of the MSB for the original input sequence is inverted to the plurality of XNOR gates provided to an input line of the one or more input lines corresponding to the input bit sequence.

2. The multiplier-accumulator of claim 1, wherein the outputter is configured to apply a first correction value, that is determined based on a sum of weights set to the plurality of XNOR gates for the operation results, to the operation results in which the partial product results are summed.

3. The multiplier-accumulator of claim 2, wherein the outputter is configured to subtract, from the operation results, the first correction value that is determined as a half of the sum of the weights.

4. The multiplier-accumulator of claim 1, wherein the input encoder is configured to sequentially transmit a signal corresponding to a logical value of an input bit sequence having a same number of bits as a number of bits of the original input sequence to the plurality of XNOR gates during a cycle corresponding to the number of bits of the original input sequence.

5. The multiplier-accumulator of claim 1, wherein the multiplier-accumulator is configured to record a sum of weights individually set to the plurality of XNOR gates for multiplication and accumulation.

6. The multiplier-accumulator of claim 1, wherein the plurality of XNOR gates is provided along an input line of the one or more input lines for the input bit sequence for each bit position allocated to a plurality of output lines grouped for a single operation of multiplication and accumulation, and the encoder comprises a weight encoder configured to set the weight bit sequence to an XNOR gate provided along the input line for each bit position.

7. The multiplier-accumulator of claim 6, wherein the outputter is configured to apply a second correction value that is determined based on a sum of one or more input bit sequences to the operation results in which the partial product results are summed.

8. The multiplier-accumulator of claim 7, wherein the outputter is configured to subtract, from the operation results, the second correction value that is determined as a half of the sum of the one or more input bit sequences.

9. The multiplier-accumulator of claim 6, wherein the plurality of XNOR gates is provided in a same number as a number of bits of an original weight sequence for an individual output for each of the one or more input lines, and the multiplier-accumulator further comprises an additional memory cell provided along an additional line distinct from an output line for input summation.

10. The multiplier-accumulator of claim 6, wherein, in response to applying an input logical value for each bit position of one or more input bit sequences for multiplication and accumulation, the multiplier-accumulator is configured to calculate a sum of the one or more input bit sequences by summing the input logical value for each bit position based on a corresponding bit position.

11. The multiplier-accumulator of claim 1, wherein the outputter is configured to apply a third correction value based on a number of inputs to the operation results, when the encoder comprises an input encoder configured to encode an original input sequence and a weight encoder configured to encode an original weight sequence.

12. The multiplier-accumulator of claim 11, wherein the outputter is configured to add, to the operation results, the third correction value that is determined as a value acquired by dividing the number of inputs by 4.

13. The multiplier-accumulator of claim 1, wherein the multiplier-accumulator is configured to receive P inputs through P input lines and to set a weight logical value corresponding to each bit position of a weight set for each of the P inputs to a corresponding XNOR gate.

14. The multiplier-accumulator of claim 1, wherein for each completion of calculation of an output for a node of a subsequent layer in a layer of a neural network, the multiplier-accumulator is configured to set a weight for an output for another node of the subsequent layer to the plurality of XNOR gates.

15. The multiplier-accumulator of claim 1, wherein the multiplier-accumulator further includes one or more output lines grouped for each of a plurality of nodes of a subsequent layer connected to a layer of a neural network, and is configured to set a weight logical value for an XNOR gate for each of the one or more output lines, and to perform multiplication and accumulation in a plurality of nodes of the subsequent layer in parallel.

16. The multiplier-accumulator of claim 1, wherein the multiplier-accumulator is configured to perform a summation of a partial product corresponding to a bit position corresponding to a corresponding output line by accumulating an analog signal representing XNOR results output from an XNOR gate connected to a same output line among the plurality of XNOR gates in a single cycle.

17. The multiplier-accumulator of claim 1, wherein the encoder is configured to apply a signal corresponding to a logical value corresponding to a single cycle among logical values of an input bit sequence input to a corresponding input line of the one or more input lines to an XNOR gate provided along the corresponding input line.

18. A computing method performed by a multiplier-accumulator, the computing method comprising:

applying, to a plurality of exclusive negative OR (XNOR) gates corresponding to each of one or more input lines, a signal corresponding to a sequence in which a logical value of a most significant bit (MSB) is inverted from an original sequence expressed in 2's complement of a corresponding sequence for either one or both of an input bit sequence and a weight bit sequence;

in response to the plurality of XNOR gates receiving signals corresponding to an input bit sequence and a weight bit sequence corresponding to a corresponding input line of the one or more input lines, outputting partial product results between the input bit sequence and the weight bit sequence; and generating an output in which a correction value is applied to operation results in which the partial product results output from the plurality of XNOR gates are summed, wherein the original sequence expressed in 2's complement is inverted to a number system having bit values of only −1 and +1, the input bit sequence and the weight bit sequence are expressed in the number system having bit values of only −1 and +1;

wherein the applying comprises:

sequentially receiving an original input sequence expressed in 2's complement of the input bit sequence for each bit position; and in response to receiving the MSB, applying a signal corresponding to a value in which the logical value of the MSB for the original input sequence is inverted to the plurality of XNOR gates provided to an input line of the one or more input lines corresponding to the input bit sequence.

19. A non-transitory computer-readable storage medium storing instructions that, when executed by one or more processors, configure the one or more processors to perform the method of claim 18.

20. A multiplier-accumulator comprising:

an encoder configured to generate a sequence in which a logical value of a most significant bit (MSB) is inverted from an original sequence expressed in 2's complement of a corresponding sequence for either one or both of an input bit sequence and a weight bit sequence;

a plurality of memory cells provided along one or more input lines and configured to output partial product results between the input bit sequence and the weight bit sequence, based on the generated sequence; and an outputter configured to generate an output based on a summation of the partial product results and one or more correction values, wherein the original sequence expressed in 2's complement is inverted to a number system having bit values of only −1 and +1, the input bit sequence and the weight bit sequence are expressed in the number system having bit values of only −1 and +1, and wherein the encoder comprises an input encoder configured to:

sequentially receive an original input sequence expressed in 2's complement of the input bit sequence for each bit position; and in response to receiving the MSB, apply a signal corresponding to a value in which the logical value of the MSB for the original input sequence is inverted to the plurality of memory cells provided to an input line of the one or more input lines corresponding to the input bit sequence.

21. The multiplier-accumulator of claim 20, wherein the one or more correction values comprises either one or both of:

a first correction value determined based on a sum of one or more weight bit sequences including the weight bit sequence; and a second correction value determined based on a sum of one or more input bit sequences including the input bit sequence.

22. The multiplier-accumulator of claim 20, wherein each of the memory cells includes an exclusive negative OR (XNOR) gate.

23. The multiplier-accumulator of claim 20, wherein a number of bits of the generated sequence is a same number of bits of the original sequence.

* * * * *